US009020325B2

(12) United States Patent
Shannon

(10) Patent No.: US 9,020,325 B2
(45) Date of Patent: Apr. 28, 2015

(54) STORYBOARD-DIRECTED VIDEO PRODUCTION FROM SHARED AND INDIVIDUALIZED ASSETS

(71) Applicant: Storyvine, LLC, Boulder, CO (US)

(72) Inventor: Kyle Shannon, Boulder, CO (US)

(73) Assignee: Storyvine, LLC, Boulder, CO (US)

( * ) Notice: Subject to any disclaimer, the term of this patent is extended or adjusted under 35 U.S.C. 154(b) by 422 days.

(21) Appl. No.: 13/676,417

(22) Filed: Nov. 14, 2012

(65) Prior Publication Data

US 2014/0133834 A1 May 15, 2014

(51) Int. Cl.
*H04N 9/80* (2006.01)

(52) U.S. Cl.
CPC ......................... *H04N 9/80* (2013.01)

(58) Field of Classification Search
CPC .................... H04N 21/854; H04N 2201/3267; H04N 21/84
See application file for complete search history.

(56) References Cited

U.S. PATENT DOCUMENTS

| 6,760,042 | B2 | 7/2004 | Zetts |
| 8,347,213 | B2 | 1/2013 | Clifton et al. |
| 2007/0162854 | A1 | 7/2007 | Kikinis |
| 2008/0092047 | A1 | 4/2008 | Fealkoff et al. |
| 2009/0201298 | A1 | 8/2009 | Jung |
| 2010/0050080 | A1 | 2/2010 | Libert |
| 2010/0205562 | A1 | 8/2010 | de Heer |
| 2010/0293061 | A1 | 11/2010 | Singer |
| 2010/0322589 | A1 | 12/2010 | Henderson |
| 2011/0066945 | A1 | 3/2011 | Lee |
| 2011/0218997 | A1 | 9/2011 | Boiman |
| 2011/0276864 | A1 | 11/2011 | Oules |
| 2012/0042251 | A1* | 2/2012 | Rodriguez ..................... 715/723 |
| 2012/0233550 | A1 | 9/2012 | Zimmon |

FOREIGN PATENT DOCUMENTS

| KR | 1020020005883 | 1/2002 |
| KR | 1020080080248 | 9/2008 |
| WO | 2010126224 | 11/2010 |

OTHER PUBLICATIONS

Changhu Wang, Sketch2Cartoon: Composing Cartoon Images, Oct. 28, 2011, 2 Pages.

(Continued)

*Primary Examiner* — Tat Chio

(74) *Attorney, Agent, or Firm* — Marsh Fischmann & Breyfogle LLP; Daniel J. Sherwinter

(57) ABSTRACT

Systems and methods are described for automatically driving portions of a video production workflow according specifications governed by a data-rich storyboard. Embodiments operate in context of a novel video production workflow in which much or all of the production expertise of a traditional production workflow collaborates at a storyboard phase of the workflow to architect a single, data-rich storyboard according to concepts and rules. The rich storyboard is generated and stored in a data framework that drives specifications over the workflow in such a way that portions of the workflow can be automated and consistently repeated. For example, the rich storyboard drives generation of automated coaches for acquisition and pre-auditing of individualized story assets from storymakers. The rich storyboard can then drive automated rendering of the assets into multiple, individualized storyvine video products that each conforms to the rich storyboard concepts, rules, and specifications.

22 Claims, 9 Drawing Sheets

(56) References Cited

OTHER PUBLICATIONS

Eric Schumacher-Rassmussen, It's so easy: Roxio introduces Easy Media Creator 7, ISSN: 1525-4658; vol. 17; Issue 3, Mar. 1, 2004, 2 pages.

ArcSoft Demos Smart Mobile Video Editor at Mobile World Congress 2008, Business Wire, Feb. 10, 2008, 2 pages.

International Search Report and Written Opinion mailed Mar. 14, 2014, for PCT/US2013/070191, 11 pages.

* cited by examiner

STORYBOARD-DIRECTED VIDEO PRODUCTION FROM SHARED AND INDIVIDUALIZED ASSETS

FIELD

Embodiments relate generally to video production, and, more particularly, to rich-storyboard-directed video asset gathering and production.

BACKGROUND

Professional video production can traditionally be costly and time-consuming. In a traditional environment, a concept is provided to one or more front-end experts (e.g., pre-production experts, like writers and directors), who decide how to convey the concept and what video and/or other content to gather and include. The content is then acquired, including shooting any desired video, by acquisition experts (e.g., directors, set designers, camera operators, lighting designers, sound designers, etc.). Once acquired, the content is passed to back-end experts (e.g., post-production experts, like directors, video editors, and renderers) to generate the final video production output. At each stage of production, corresponding experts attempt to mold the inputs they receive into desired outputs. For example, the director tries to shoot lots of footage in an attempt to acquire at least what will be needed to cut a good final product to satisfy the concept; then the footage is cut edited in post-production in an attempt to satisfy the director's vision. With these approaches, many experts tend to be used throughout the various stages of the process, each trying to produce desired outputs from provided inputs without further complicating the production with additional iterations, re-shoots of footage, re-edits, etc.

These traditional approaches can be limited in a number of contexts. One such limitation is that traditional approaches can be time- and/or cost-prohibitive for many, if not most, uses. As video production becomes more commonplace, more contexts arise in which video productions are desired, but it is impractical or impossible to spend adequate time and/or funds on traditional professional video production workflows and associated experts. Another such limitation is that the final output of traditional approaches is typically a single video production that hopefully satisfies a provided concept. Increasing numbers of contexts are arising in which there is a desire for many, individualized video productions that conform to a singular concept. Traditional workflows do not tend to be conducive to outputting multiple video productions from shared expert resources, and doing so tends to be expensive and time-consuming. Further, traditional approaches do not tend to lend themselves to creating multiple productions according to a similar concept, particularly where the video assets are gathered by different people, in different places and/or at different times, with different skills, etc.

BRIEF SUMMARY

Among other things, systems and methods are described for automatically driving portions of a video production workflow according specifications governed by a data-rich storyboard. Embodiments operate in context of a novel video production workflow that attempts to move many or all of the production expertise of a traditional production workflow to a front-end storyboard phase. For example, concept, pre-production, acquisition, post-production, approval, and/or other experts collaborate at a storyboard phase of the workflow to architect a single, data-rich storyboard according to concepts and rules. The rich storyboard is generated and stored in a data framework that drives specifications over the workflow in such a way that portions of the workflow can be automated and consistently repeated. For example, the rich storyboard drives generation of automated coaches (e.g., wizard applications) for acquisition and pre-auditing of individualized story assets from users ("storymakers"). The rich storyboard can then drive automated rendering of the assets into multiple, individualized video products that each conforms to the rich storyboard concepts, rules, and specifications.

According to one set of embodiments, a method is provided for generating a video production from a rich storyboard. The method includes: identifying a computer-readable rich storyboard that defines production specifications and a sequence of storybeats for use in a number of video productions, each storybeat comprising a set of storybeat assets, a first portion of the storybeat assets being shared storybeat assets associated with shared asset data, and a second portion of the storybeat assets being individualized storybeat assets associated with asset acquisition specifications; generating a computer-implemented asset acquisition coach operable, for each individualized storybeat asset, to acquire individualized asset data according to its asset gathering specifications; receiving, via the computer-implemented asset acquisition coach, individualized asset data for each individualized storybeat asset; and communicating the individualized asset data for each individualized storybeat asset to a rendering system in such a way that a video production can be rendered according to the sequence of storybeats, with each shared storybeat asset being rendered according to the production specifications and its associated shared asset data, and each individualized storybeat asset being rendered according to the production specifications and its associated individualized asset data. Some such embodiments include a computer program product residing on a non-transitory, processor-readable medium and having processor-readable instructions, which, when executed, cause a processor to perform the method.

According to another set of embodiments, a storymaker system is provided for acquiring individualized assets for use in video productions generated according to a rich storyboard. The system includes a computer-implemented asset coaching subsystem and a computer-implemented asset auditing subsystem. The computer-implemented asset coaching subsystem is operable to: receive asset acquisition specifications generated according to a rich storyboard that defines production specifications and a sequence of storybeats for use in a number of video productions, each storybeat comprising a set of storybeat assets, a first portion of the storybeat assets being shared storybeat assets associated with shared asset data, and a second portion of the storybeat assets being individualized storybeat assets associated with the asset acquisition specifications and asset acceptance specifications; and acquire, via a computer-implemented graphical asset acquisition interface, individualized asset data for each individualized storybeat asset according to its respective asset gathering specifications. The computer-implemented asset auditing subsystem is in communication with the asset coaching subsystem and is operable to audit the individualized asset data to determine whether the individualized asset data conforms with the asset acceptance specifications. The computer-implemented asset coaching subsystem further operable, when the individualized asset data conforms with the asset acceptance specifications, to communicate the individualized asset data of each individualized storybeat asset in such a way that a video production can be rendered according to the sequence of storybeats with each individualized storybeat asset being rendered according to the production specifications and its associated individualized asset data.

According to yet another set of embodiments, an agency system is provided for acquiring individualized assets for use in video productions generated according to a rich storyboard. The system includes a storyvine storyboard subsystem and a storyvine rendering subsystem. The storyvine storyboard subsystem is operable to: generate a computer-readable rich storyboard that defines production specifications and a sequence of storybeats for use in a number of video productions, each storybeat comprising a set of storybeat assets, a first portion of the storybeat assets being shared storybeat assets associated with shared asset data, and a second portion of the storybeat assets being individualized storybeat assets associated with asset acquisition specifications; and communicate the asset acquisition specifications to a computer-implemented asset coaching subsystem operable to acquire, via a graphical asset acquisition interface, individualized asset data for each individualized storybeat asset according to its respective asset gathering specifications. The storyvine rendering subsystem is operable to: receive the individualized asset data for the individualized storybeat assets from the computer-implemented asset coaching subsystem; and render a video production according to the sequence of storybeats by rendering each shared storybeat asset according to the production specifications and its associated shared asset data, and by rendering each individualized storybeat asset according to the production specifications and its associated individualized asset data.

BRIEF DESCRIPTION OF THE DRAWINGS

The present disclosure is described in conjunction with the appended figures.

Figure 1:
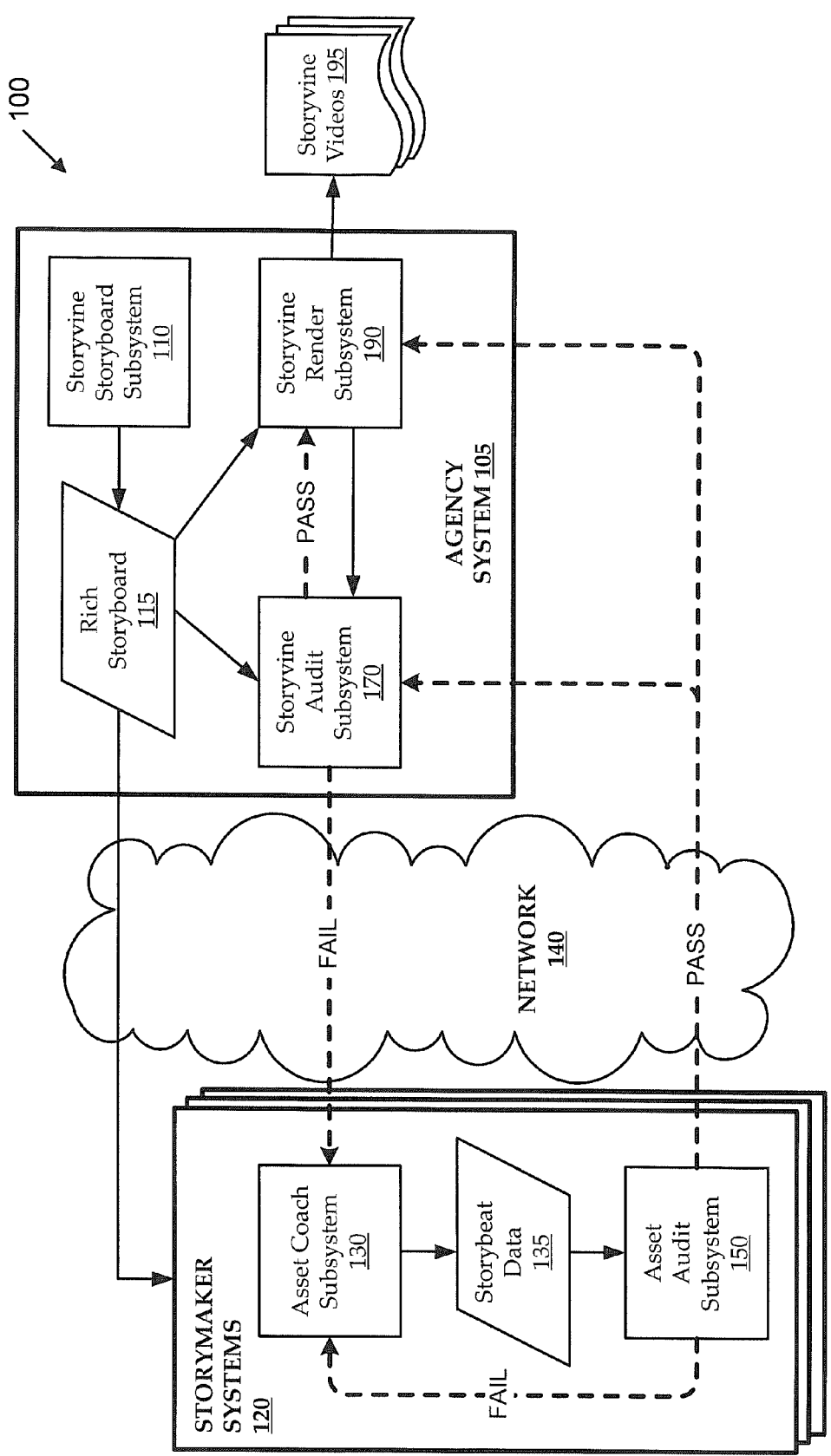
FIG. 1 shows a block diagram of an embodiment of a video production environment having an agency system in communication with multiple storymaker systems over a network, according to various embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

As personal computing power increases, more information is being consumed through more platforms using video. Accordingly, there is an increasing desire to create high-quality video productions for contexts ranging from full-scale productions (e.g., movies, television programs, documentaries, etc.) to short-form productions (e.g., video blogs, advertisements, video cards and invitations, etc.). Typically, an end user that wishes to generate a video production has limited options. At one end of a spectrum of options, the end user can shoot and/or otherwise gather video footage and use consumer-level software to produce a final product (e.g., including ex post rearranging of video clips, adding of scene transitions, adding of music, etc.). While this type of approach tends to be cost-effective, the resulting production tends to look unprofessional. At another end of the spectrum of options, the end user can hire video production experts to develop a concept, shoot and gather footage, edit the footage, and produce (e.g., render) a final video product using professional video production software and hardware. Under this type of approach results in a production that looks professional, but tends to be costly and time-consuming.

Embodiments described herein address contexts in which unprofessional-looking video productions are insufficient or undesirable, and where it is cost- and/or time-prohibitive (or otherwise impractical or undesirable) to use a traditional, professional video production workflow. Suppose a national stock brokerage firm has hundreds or thousands of agents, and wishes to have video introductions from each agent on their website. They further wish each video, not only to look professional, but to have a consistent look and feel (e.g., with certain common graphics, color schemes, story flow, conformance to marketing and branding objectives, etc.). Professionally producing each agent video according to a traditional professional workflow would be expensive and time-consuming. Further, it would tend to be difficult and expensive to control consistency across the video products, particularly where agents are geographically diverse and/or joining the agency at different times.

Embodiments operate in context of a novel video production workflow that attempts to move many or all of the experts that tend to be used throughout the traditional production workflow (e.g., acquisition and post-production experts) to the front end. According to some embodiments, concept, pre-production, acquisition, post-production, approval, and/or other experts collaborate at a storyboard phase of the workflow to architect a single, data-rich storyboard according to concepts and rules. The rich storyboard is generated and stored in a data framework that drives specifications over the workflow in such a way that portions of the workflow can be automated and consistently repeated. For example, the rich storyboard drives generation of automated coaches (e.g., wizard applications) for acquisition and pre-auditing of individualized story assets from users ("storymakers"). The rich storyboard can then drive automated rendering of the assets into multiple, individualized video products that each conforms to the rich storyboard concepts, rules, and specifications.

In the following description, numerous specific details are set forth to provide a thorough understanding of various embodiments. However, one having ordinary skill in the art should recognize that the invention can be practiced without these specific details. In some instances, circuits, structures, and techniques have not been shown in detail to avoid obscuring the present invention.

Turning to FIG. 1, a block diagram is shown of an embodiment of a video production environment 100 having an agency system 105 in communication with multiple storymaker systems 120 over a network 140, according to various embodiments. Embodiments allow agencies to control acquisition of individualized data from multiple storymakers and to control use of that data in producing multiple storyvine videos with a common look-and-feel across a sequence of storybeats, all according to a pre-defined, data-rich storyboard. As used herein, an "agency" is intended generally to refer to any individual or entity by whom, or on whose behalf, a rich storyboard is created with the intent to produce one or more storyvine video productions. A "rich storyboard" represents a number of rules, concepts, and other inputs from the agency and/or others as a number of computer-readable specifications. For example, the rich storyboard includes production specifications, asset gathering specifications, auditing specifications, etc. The rich storyboard also includes a number (e.g., a sequence) of "storybeats," each representing a portion (e.g., clip, segment, vignette, etc.) of a final storyvine video production as a set of storybeat assets and layout specifications (e.g., position, size, shape, transparency, transition, layer, etc.). The "storybeat assets" in each storybeat can include video data, textual data, audio data, and/or any other suitable data. In each rich storyboard, at least some of the storybeats are "individualized storybeats," for which at least some of the assets are "individualized assets." The rich storyboard defines which storybeat assets are individualized assets and associates each individualized asset with one or more asset acquisition criteria. Individualized storybeat asset data is acquired from "storymakers" (end users) according to their asset acquisition criteria. Other storybeat assets are "shared storybeat assets," in that they are intended for use across multiple storyvine video productions generated from the same rich storyboard. For example, shared storybeat assets can be acquired from a pool of pre-stored assets, generated specifically for use with a particular rich storyboard, etc., so that some or all of the storyvine video productions generated from the same rich storyboard will manifest a particular, desired look and feel. The terms discussed above will be further understood in context of the descriptions of embodiments provided herein.

The agency system 105 includes a storyvine storyboard subsystem 110, a storyvine audit subsystem 170, and a storyvine render subsystem 190. The storyvine storyboard subsystem 110 generates a data-rich storyboard 115 that represents a number of rules, concepts, and other inputs as a number of computer-readable specifications. For example, conceptual experts (e.g., writers and directors) begin to formulate a high-level story concept and flow. Preproduction experts (e.g., directors, set and lighting designers, branding and marketing experts, etc.) mature the high-level concept and flow into storybeats, each having associated timing (e.g., timing ranges, synchronization information, etc.), transitions, storybeat assets, etc. Some shared storybeat assets are already available and others are designed and/or otherwise generated. Where individualized storybeat assets are desired, specifications are developed to define what data is desired, how the data should be collected, when and/or how collected data should be approved, etc. Postproduction experts (e.g., rendering and editing experts) work with the conceptual and pre-production experts to develop production specifications for how the storybeats should be rendered, edited, approved, etc. Some or all of these and/or other types of specifications are formulated into computer-readable specifications that make up the rich storyboard 115. In this way, substantially the entire production workflow can be automated and directed according to the rich storyboard 115.

The rich storyboard 115 is communicated over the network 140 to one or more storymaker systems 120. Each storymaker system 120 includes an asset coach subsystem 130. The asset coach subsystem 130 is configured to coach individual storymakers to provide individualized storybeat asset data 135 for use in creating storyvine video productions 195. In some embodiments, the storymaker systems 120 include an asset audit subsystem 150 that audits the provided storybeat asset data 135 before allowing it to be used in a storyvine video production 195. In some implementations, the asset audit subsystem 150 automatically audits the provided storybeat asset data 135 according to asset acquisition specifications and/or asset auditing specifications defined according to the rich storyboard 115 received from the agency system 105.

Acquired (e.g., and audited), individualized storybeat asset data 135 is communicated back to one or more subsystems of the agency system 105. In some implementations, the storybeat asset data 135 is communicated to the storyvine audit subsystem 170, where it is manually and/or automatically audited alone and/or in the context of other assets of its storybeat. For example, a pre-rendered version of the storybeat is communicated to auditing personnel who can review and pre-approve the storybeat via the storyvine audit subsystem 170. In other implementations, the storybeat asset data 135 is communicated to the storyvine render subsystem 190, where it is rendered into a storybeat, a set of storybeats, or an entire storyvine video production 195. For example, the individualized storybeat asset data 135 and shared storybeat asset data is rendered according to production specifications defined by the rich storyboard 115 to generate a final video product, a draft video product (e.g., a proof, a low-resolution version, etc.), etc. The rendered video product can then be communicated to the storyvine audit subsystem 170 for further auditing (e.g., manual and/or automated auditing). The storyvine audit subsystem 170 can determine whether further acquisition of assets is desired, re-acquisition of assets is desired, a final storyvine video product can be released, etc. The final storyvine video productions 195 can be stored, published to the Internet, or used in any other desired manner.

Embodiments of the video production environment 100 can be implemented in any suitable network architecture. In one exemplary implementation, subsystems of the agency system 105 are all collocated. For example, the subsystems may all be implemented as part of a single computational environment, in a single local area network, on a single server or group of servers, etc. In other implementations, some or all of the subsystems of the agency system 105 are remote from one another. For example, a single computational environment can be configured to include the storyvine storyboard subsystem 110 and the storyvine audit subsystem 170 as applications, while the storyvine render subsystem 190 is implemented in a remote, cloud-based rendering environment in communication with the other subsystems over a public or private network. The agency system 105 can communicate with the storymaker systems 120 via any suitable type of network 140. For example, the network 140 can include public and/or private networks, wired and/or wireless network links, etc. Each storymaker system 120 can be implemented on any suitable device or system. In some implementations, the storymaker system 120 is implemented on a fixed or mobile user device, like a computer, smart phone, tablet, etc. In other implementations, the storymaker system 120 is implemented as an application of a content acquisition device, like a video camera. For example, either a smart phone with video capability or a professional video camera can be configured to run applications, including the asset coach subsystem 130 and/or the asset audit subsystem 150.

For the sake of illustration, a real estate brokerage agency desires to publish introduction videos from each of its agents on its website. The broker agents are geographically dispersed, have different personalities, and have different skills and statistics to highlight. While the brokerage agency wants to highlight those differences, it also wants to convey a sense of cohesiveness, professionalism, and brand. Further, particularly as broker agents constantly join and leave the team, and as information associated with each broker agent changes over time, it is important to the brokerage agency to be able to generate and change agent videos in a manner that is individualized and dynamic, while also being consistent and cost-effective.

The brokerage agency hires story architects to develop a concept to maintain across the videos. The story architects (including various conceptual, pre-production, post-production, and/or other expertise) collaborate with the agency's marketing team and other personnel to develop a rich storyboard 115 for the agent videos. Each agent introduction video is architected to include many elements common to all the videos that provide a consistent and professional look and feel (graphical elements, timeline, layout, color scheme, etc.). However, each video is also architected to include individualized portions that can be unique to each agent (e.g., unique graphics, video segments, informational listings, etc.).

The rich storyboard 115 drives building of an environment using the asset coach subsystem 130 through which each broker agent (storymaker) is coached through providing desired storybeat asset data 135 through a storymaker system 120. For example, one screen asks the agent to fill in text fields (e.g., name, location, profile, etc.), and another screen asks the agent to place the video camera three feet away and to speak for twenty seconds about the agent's philosophy on selling a family home. The storybeat asset data 135 from each broker agent can be audited using the asset audit subsystem 150 to determine whether the input meets predefined acceptance criteria (e.g., data format, image quality, lighting quality, duration, etc.). If not, the broker agent can be asked to try again.

Once the storybeat asset data 135 is acquired (e.g., and accepted) for a broker agent, it can be combined with shared assets and other rich storyboard information (e.g., production specifications) to automatically render a storyvine video production 195 using the storyvine render subsystem 190. For example, the individualized assets are meshed into a pre-conceptualized video product having any desired timeline, music, graphics, transitions, and/or other features (e.g., static and/or dynamic features) as dictated by the rich storyboard 115, with little or no need for additional back-end editing or other processing. As other broker agents finish acquiring their storybeat asset data 135, storyvine video productions 195 can be rendered using the storyvine render subsystem 190 according to the same rich storyboard 115. Though each broker agent may acquire their storybeat asset data 135 in different ways (e.g., using a professional videographer or a smart phone camera), in different locations, at different times, etc., the asset collection can be coached and audited to result in a substantially consistent-looking set of storybeat asset data 135 from each broker agent. Accordingly, the rich storyboard 115 facilitates using individualized assets to output consistent, production-quality storyvine videos 195 for any number of storymakers, while preserving high-level concept and production objectives.

A number of features can be realized with a video production environment like the ones discussed herein. One such feature is that production costs can be spread (e.g., amortized) across many video productions. For example, even if expensive expertise from across the traditional video production workflow is used in creating the rich storyboard 115, that same rich storyboard 115 can be used to direct production of multiple videos with little or no additional expert intervention. Another feature is that each storybeat asset (e.g., whether shared or individualized) can be associated with a rich, hierarchical metadata stack. For example, an individualized storybeat asset can be associated with acceptance specifications (e.g., thresholds for lighting, image quality, duration, etc.), role specifications (e.g., whether the video asset can be approved by the story maker, or whether it has to be approved by someone with particular authority), production specifications (e.g., attributes that define its context within the storyboard, sequence, foreground or background level, transparency, transition, etc.), acquisition specifications (e.g., prompt instructions, coaching page layout instructions, etc.), position within a data hierarchy (e.g., a particular video of a particular agent of a particular division of a particular agency, etc.), etc.

Another feature is that the individualized storybeat assets are acquired according to directives of the rich storyboard 115, but they "live" independent of the rich storyboard 115 and/or of the storyvine video productions 195 of which they are a part. For example, shared and individualized assets can be dynamically rendered into a storyvine video production 195 according to the rich storyboard 115; then later remixed according to modifications to the rich storyboard 115, their metadata, their storybeat asset data 135, etc. For the sake of illustration, suppose an agent of the brokerage agency in the example above moves to a new state. Because each story asset is separate from the final video product, the individualized assets that reference the agent's state can be updated (e.g., manually or automatically) and the video product can be re-rendered with relatively little effort. Another related feature is that the rich storyboard 115 facilitates application of high-level business rules and the like to collection, approval, and/or other tasks relating to low-level storybeat asset data 135. While the rich storyboard 115 can drive acquisition of a defined asset (e.g., a particular shared or individualized graphic, video segment, text element, etc.), it can also define business rules to dynamically determine which of a set of assets to acquire and/or to modify one or more assets. For example, a broker agent enters an office zip code as an individualized asset via a wizard. When the video product renders, a shared asset of the video displaying a map in the background automatically highlights the region of the map served by the broker agent's zip code.

Figure 2:
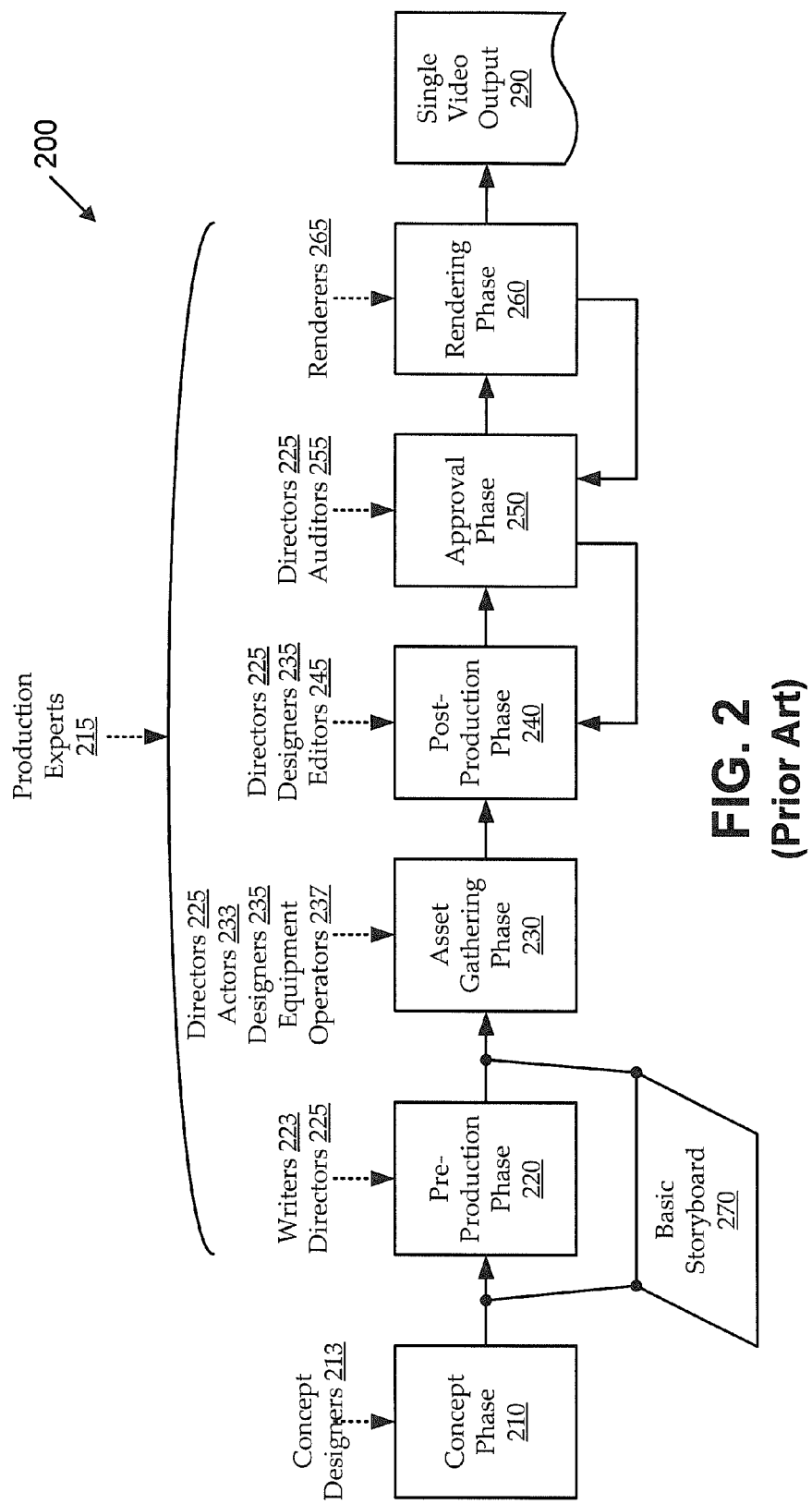
FIG. 2 shows a flow diagram of a traditional video production workflow, according to some prior art implementations.

These and other features will be appreciated more fully in light of descriptions of various embodiments herein and in comparison to traditional approaches to video production workflows. Turning to FIG. 2, a flow diagram is shown of a traditional video production workflow 200, according to some prior art implementations. The workflow 200 includes a number of phases and illustrates some typical input expertise to those phases and outputs from those phases. The names of the phases are intended only to be illustrative, as real-world workflows tend to include appreciable overlap between phases, iteration within and between phases, parallel performance of phases, etc. The expertise ascribed to the phases is also intended only to be illustrative, as different types of productions utilize different types of expertise (or similar expertise with different titles) in different ways.

As illustrated, a traditional workflow starts at a concept phase 210 when a concept is generated by concept designers 213 for a video production. The concept designers 213 can be agency personnel, marketing experts, advertising experts, writers, and/or any other suitable individuals or entities. For example, the concept may manifest as a script or screenplay, or a set of high-level concept objectives (e.g., branding objectives, etc.). During the concept phase, other rules can be determined, such as budget and business rules. The concept is further developed in a pre-production phase 220, during which writers 223, directors 225, and/or any other suitable individuals or entities generate a basic storyboard 270. The basic storyboard 270 can divide the story concept into a set of "shots" on a timeline. In some instances, the writers 223, directors 225, and/or others use the basic storyboard 270 to conceptualize each shot with plans for location settings, actors, props, shot types (e.g., camera position, angle, etc.), effects (e.g., lighting, camera movement, computer graphics, etc.), etc.

After the pre-production phase 220, the basic storyboard 270 is turned into a video production output 290. During an asset gathering phase 230, the directors 225 can work with actors 233, designers 235 (e.g., of lighting, sets, props, effects, etc.), equipment operators 237 (e.g., camera operators, grips, etc.), and/or any other suitable individuals or entities to gather the assets needed for each shot. For example, each shot is set up and filmed. Typically, to avoid having to call back all actors 233, designers 235, equipment operators 237, and/or others for re-shooting of scenes, appreciably more footage is gathered than necessary with plans for post-editing (e.g., cutting, compositing, etc.). During a post-production phase 240, all the footage and/or other materials (e.g., computer effects, etc.) are used to generate any useful edits (e.g., proofs, pre-edits, final cuts, etc.). The directors 225 and designers 235 can work with editors 245 to prepare the footage (e.g., decide on cuts, transitions, effects, etc.), generate and apply effects (e.g., compose and synchronize music and sound effects, composite computer graphics and special effects, adjust lighting and/or other aspects of footage, etc.), etc.

The edits can be assessed during an approval phase 250 by the directors 225 and auditors 255. For example, footage can be checked for technical issues (e.g., shot consistency, clarity of lighting and sound, etc.) and/or other issues (e.g., how closely the edits satisfy the initial concept and rules, etc.). If the edits are not approved, footage can be re-cut or otherwise modified by returning to the post-production phase 240 (or potentially back to the asset gathering phase 230). When edits are finally approved, they can be stored as a master. The master can be rendered in a rendering phase 260 by rendering experts 265. For example, the master can be converted to desired formats, final edits (e.g., clean-ups) can be applied, etc.

Each phase involves a number of types of expertise, and that expertise is often provided by many different types of production experts 215 (e.g., writers 223, directors 225, designers 235, equipment operators 237, editors 245, auditors 255, renderers 265, etc. Accordingly, production expertise is typically used across the workflow, which can be expensive, difficult to schedule, difficult to repeat (e.g., when footage is gathered at different times and/or in different locations), etc. Further, returning to a phase (e.g., for re-shooting, re-editing, etc.) can involve re-calling corresponding experts and potentially repeating later phases of the workflow.

Additionally, though large numbers of copies and can often be generated from the master, the output of the traditional workflow is still typically a single set of master footage. For example, while the master can be re-cut for a "director's cut" version, an "extended" version, a "made for TV" version, a trailer, etc., the versions are merely re-edits (e.g., re-cuts, etc.) of the same footage, effects, etc. Any appreciable change to the single video output 290 typically involves calling back actors 233, designers 235, equipment operators 237, and/or others for a new asset gathering phase 230 (to re-shoot and/or add footage). Even then, generating a new master can involve calling back expertise and re-performing tasks of the post-production phase 240, the approval phase 250, and/or the rendering phase 260.

Figure 3:
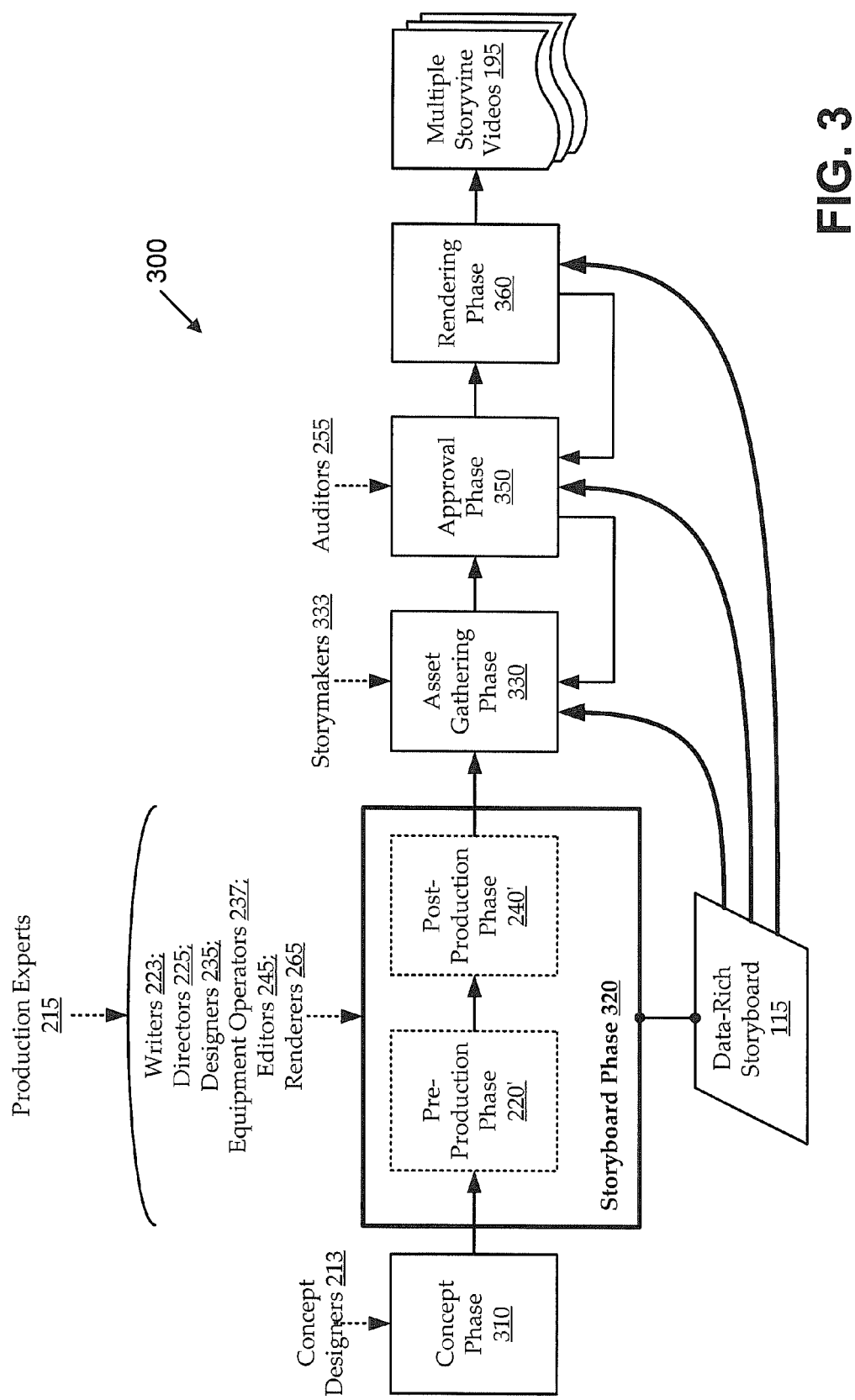
FIG. 3 shows a flow diagram of a novel video production workflow, according to various embodiments.

Turning now to FIG. 3, a flow diagram is shown of a novel video production workflow 300, according to various embodiments. The workflow 300 is illustrated in a similar format to that of the traditional workflow 200 shown in FIG. 2 for the sake of clarity and to highlight certain differences. For example, as in FIG. 2, the workflow 300 of FIG. 3 includes a number of phases and illustrates some typical input expertise to those phases and outputs from those phases, and similar names of phases and expertise are used for the sake of simplicity. However, the traditional workflow 200 and the novel workflow 300 are intended to be simplified and illustrative and should not be construed as limiting other embodiments discussed herein.

As with a traditional workflow, embodiments of the workflow 300 starts with a concept phase 210 when a concept is generated by concept designers 213 for a video production. In some implementations, the concept manifests as a script or screenplay with various types of high-level concept objectives, like branding objectives, business rules, interactivity rules, production rules, etc. In the traditional workflow 200 of FIG. 2, production experts 215 are used throughout the remaining phases of the workflow to convert the concept into a basic storyboard 270 and ultimately to a single master video production 290. In the novel workflow 300, most or all of the production expertise (and corresponding production experts 215) are front-loaded to a storyboarding phase 320. Rather than developing a traditional, basic storyboard, the output of the storyboard phase 320 is a data-rich storyboard 115, for example, as described above with reference to FIG. 1.

During the storyboard phase 320, expertise of writers 223, directors 225, designers 235, equipment operators 237, editors 245, renderers 265, and/or any other suitable individuals or entities collaborate to perform tasks of a modified pre-production phase 220' and a modified post-production phase 240', as well as additional tasks. For example, the rich storyboard 115 is designed with a sequence of storybeats, each associated with a number of specifications, including asset selections, asset gathering specifications, asset auditing specifications, production specifications, etc. The specifications define low-level details of how subsequent phases of the workflow will proceed, while attempting faithfully to represent the high-level concepts and rules. Most or all of the specifications are stored in the rich storyboard 115 as computer-readable specifications that facilitate fully or partially automated execution of subsequent phases of the workflow.

Once the rich storyboard 115 is created, subsequent phases are directed by the specifications of the rich storyboard 115. An asset gathering phase 330 can proceed in which asset gathering, asset approval, and/or other specifications from the rich storyboard 115 are used to direct acquisition of shared and individualized assets from one or more storymakers 333. This can be accomplished without the presence of directors 225, designers 235, and others, as their expertise is captured in the rich storyboard 115. Acquired assets and/or partial or completed storybeats can be audited in an approval phase 350. The approval is directed by specifications of the rich storyboard 115, though it may be fully or partially automated (e.g., with the help of auditors 255) in various implementations. For example, various production experts 215 and/or others can predefine acceptance criteria in the storyboard phase 320 for use in automatically and/or manually auditing acquired assets, storybeats, etc. In some implementations, the storymaker 333 can be coached through repeated takes to provide the desired asset data until the provided data can be approved.

Approved storybeats can then be rendered in a rendering phase 360 according to production specifications of the rich storyboard 115. For example, rendering experts 265 can determine how storybeats should interface with rendering techniques and instructions (e.g., application programming interface (API) instructions, etc.) in the storyboard phase 320 before any of the storybeats are actually acquired. In some implementations, the rendered videos are also approved before being finalized. For example, rendering settings can be adjusted (e.g., manually and/or automatically) at the approval stage. Rather than expertise being spread over the workflow to produce a single master video production, the illustrated, novel workflow 300 front-loads the expertise to produce a rich storyboard 115 from which many individualized video products (storyvine videos 195) can be generated according to a common set of concepts, rules, etc.

For the sake of illustration, suppose a traditional, basic storyboard 270 includes a shot in which a supporter of an organization stands in front of a building and speaks about why they choose to give their support. According to a traditional workflow, various production experts 215 might set up a location to look like the storyboard shot, film the scene, edit the scene, add elements to the scene (e.g., overlay graphics, add sound, etc.), approve the scene, etc. Additional effort and expertise can then be used to add the scene to other scenes and to render a final video production. If the organization later desires to make a similar video for a different supporter, various production experts 215 might once again set up a location to look like the storyboard shot, film the new scene, edit the new scene, add elements to the new scene, approve the new scene, add the new scene to other scenes, and re-render a final video production.

The rich storyboard 115, in addition to providing basic layout and guidance, can include computer-readable specifications that define how to interactively coach the supporter through providing the video footage to conform with the concept and rules, how to automatically determine whether to approve or deny provided assets (e.g., video footage and other materials), how to add and lay out elements in each scene, how to transition between scenes, how to edit and render the scenes, etc. For example, before the supporter is contacted to provide video footage, a rich storyboard 115 is already created with the production expertise effectively embedded therein. A coaching application can use specifications from the rich storyboard 115 to interactively coach the supporter through providing the desired footage, including, for example, where to stand, where to place the camera, how loudly to speak, for how long to speak, and the like. In some implementations, the specifications of the rich storyboard 115 are communicated to one or more systems to automatically direct editing of the scene, building of the scene (e.g., adding elements, etc.), approving the scene, adding the scene to other scenes, rendering a final video production including the scene, etc. For example, an editor 245 specifies in computer-readable form in the rich storyboard 115 how each scene should be edited before all the assets of all the scenes have been acquired. If the organization later desires to make a similar video for a new supporter, the coaching application can acquire the new footage from that new supporter. By acquiring and auditing the new footage according to the same specifications from the rich storyboard 115, the new footage can be cohesively added into the production framework defined by the rich storyboard 115. Accordingly, an additional video production can be generated (e.g., automatically) to include the new footage with little or no additional support from production experts 215.

Figure 4:
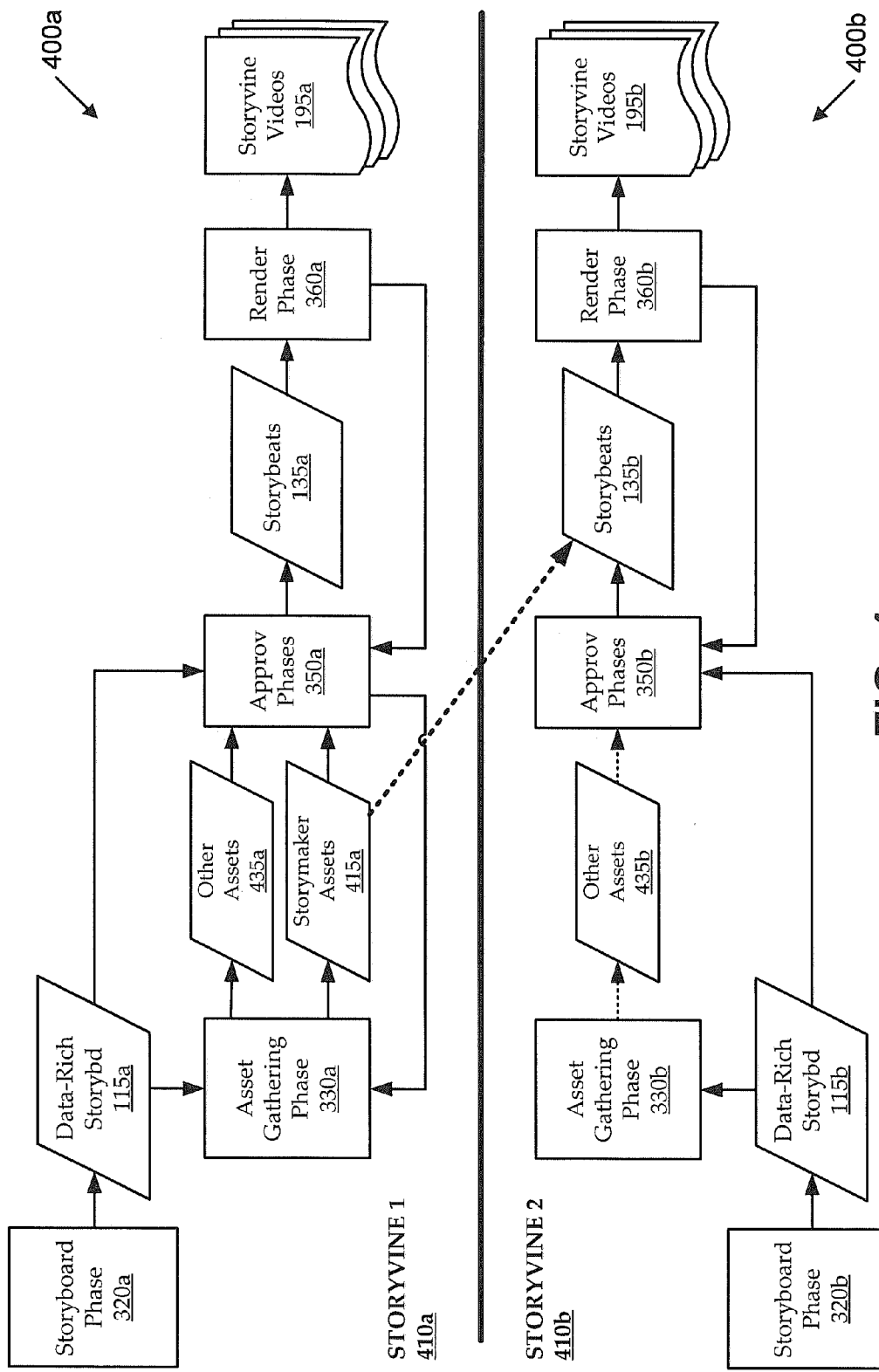
FIG. 4 shows flow diagrams of video production workflows, like the workflow of FIG. 3, which share assets between two illustrative storyvines, according to various embodiments.

FIG. 4 shows flow diagrams of video production workflows 400, like the workflow 300 of FIG. 3, which share assets between two illustrative storyvines 410, according to various embodiments. Though not shown, it is assumed that a concept is generated, for example, in a concept phase. A first workflow 400a begins at a first storyboarding phase 320a, where a first data-rich storyboard 115a is generated. The rich storyboard 115a defines specifications that drive a first asset gathering phase 330a, a first approval phase 350a, and a first rendering phase 360a. As illustrated, the asset gathering phase 330a results in a number of storymaker assets 415a and other assets 435a. For example, the storymaker assets 415a are individualized assets collected through an interactive coaching application, and the other assets 435a include shared assets and/or any other assets.

The storymaker assets 415a and other assets 435a are audited in the approval phase 350a according to specifications of the rich storyboard 115a. Storybeats can be combined into a storyvine, which can be rendered into one or more first storyvine video productions 195a in the first rendering phase 360a according to production and/or other specifications of the rich storyboard 115a. In some implementations, the approval phase 350a is actually a series of approval phases. For example, assets can be automatically approved according to approval criteria specified by the rich storyboard 115a, after which they can be turned into their respective storybeats 135a according to editing, production, and/or other specifications of the rich storyboard 115a. The storybeats 135a can also be audited in an approval phase 350a (e.g., storybeats with individualized storybeat assets can be audited individually or as a group, manually or automatically), before being used to generate a full storyvine. The storyvine can also be audited prior to being rendered, and the rendered storyvine video production 195a can also be audited. Each approval phase 350a can differ regarding whether it is fully or partially manual or automated; which individuals, entities, or systems have permission to audit at that phase; etc.

As described above, the single rich storyboard 115a can be used to acquire individualized storybeat asset data from many storymakers, and to render many corresponding, individualized video productions that conform to a common concept. In this way, the rich storyboard 115a, its associated high-level concepts and rules, and its low-level specifications, can all be generated independently from (e.g., and even prior to acquisition of) any individualized storybeat asset data that are part of final rendered storyvine video productions 195a generated from the rich storyboard 115a.

Further, in some embodiments, the gathered asset data, even individualized storybeat asset data, can also exist independently from the rich storyboard 115 criteria and context under which it was first acquired. Each storybeat asset can be stored with an associated rich metadata stack that can define any desired information that defines the asset, describes its attributes, etc. Accordingly, both shared and individualized storybeat assets can be used in multiple contexts within a particular storyboard or among multiple storyboards.

For the sake of illustration, a second workflow 400b begins at a second storyboarding phase 320b, where a second data-rich storyboard 115b is generated. For example, the second rich storyboard 115*b* is generated by the same agency, but according to a different concept. Again, the rich storyboard 115*b* defines specifications that drive second asset gathering phase 330*b*, a second approval phase 350*b* and a second rendering phase 360*b*. In some implementations, all the individualized assets of the second rich storyboard 115*b* are taken from the pool of storymaker assets 415*a* acquired for the first rich storyboard 115*a*. For example, some or all of the individualized footage is re-cut and laid out in different sequences and graphical contexts according to a second storyvine 410*b* concept and associated rich storyboard 115*b*.

An asset gathering phase 330*b* may still occur, during which shared and/or other assets 435*b* are acquired and/or generated. Those new assets can be audited (e.g., automatically) in the second approval phase 350*b* before using them to generate associated second storybeats 135*b*. The second storybeats 135*b*, including the individualized assets acquired during the first asset gathering phase 330*a*, can be audited according to criteria of the second rich storyboard 115*b* in the second approval phase 350*b*. Again, the storybeats can be combined into a new storyvine, which can be rendered into one or more second storyvine video productions 195*b* in the second rendering phase 360*b* according to production and/or other specifications of the rich storyboard 115*b*.

Suppose that a restaurant desires to have a number of videos on its website. Some desired videos are videos of servers and other employees talking about themselves, about their interests outside the restaurant, and about why they like working at the restaurant. The video concept is to look like a casual interview on the sidewalk outside the restaurant, with consistent branding elements (e.g., color schemes, logo placement, intro and outro splash graphics, etc.) an minimal additional screen graphics during the interview portions. The desired effect is a highly individualized, minimally produced look that still expresses a cohesive, strong brand. Another desired video for the website is a general advertisement for the restaurant, which includes short segments from selected employee interview videos surrounded by lots of professional graphics and other informational elements. The desired effect is a highly produced look with strong marketing focus that maintains just enough of the casual feel from the employee interview videos. The first set of employee videos could be generated according to the first workflow 400*a*, and relevant individualized assets could be reused in the second workflow 400*b* to generate the restaurant advertisement video.

Figure 5:
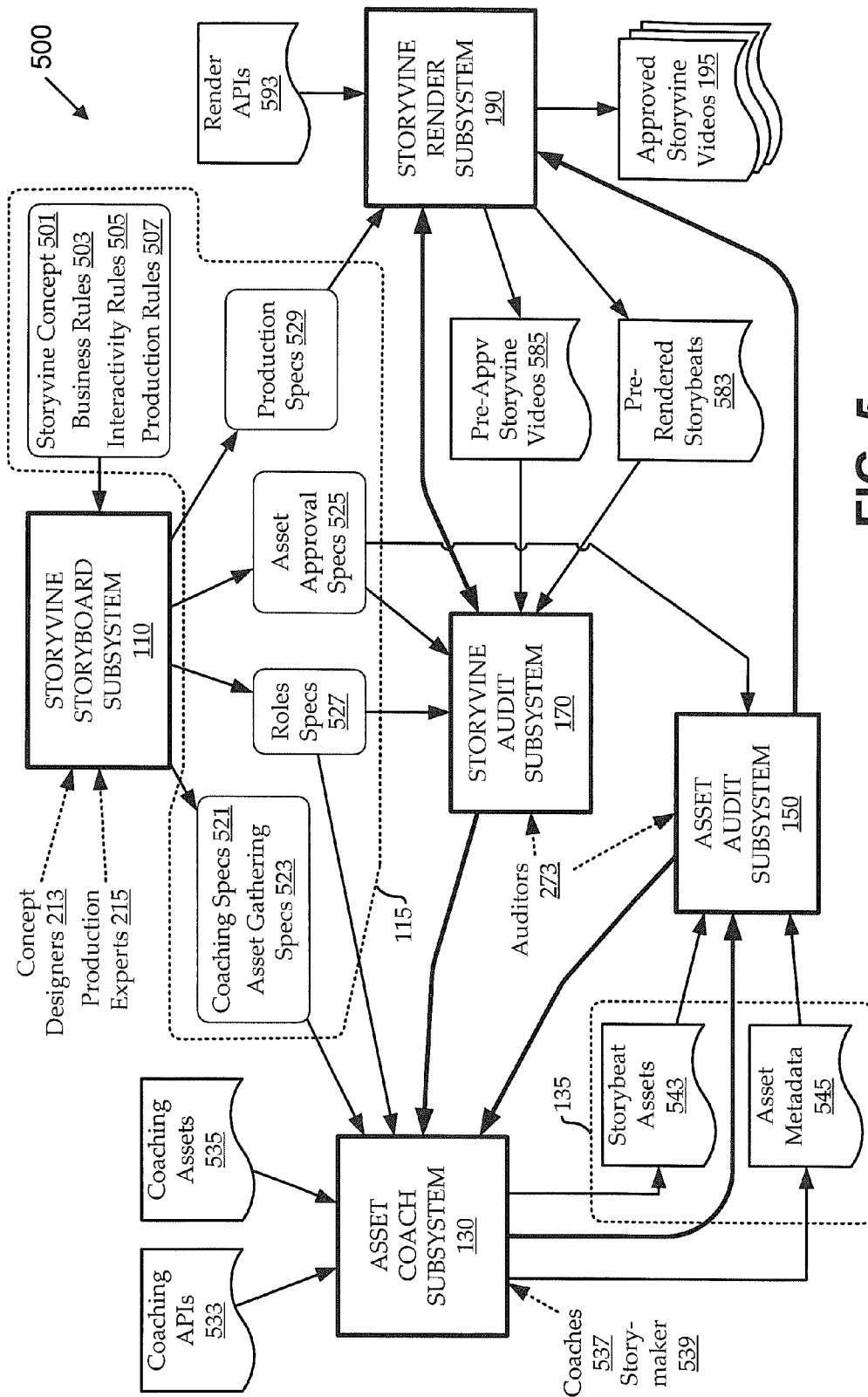
FIG. 5 shows a block diagram of an illustrative video production environment having various subsystems that exchange different types of information to produce storyvine videos from a rich storyboard, according to various embodiments.

FIG. 5 shows a block diagram of an illustrative video production environment 500 having various subsystems that exchange different types of information to produce storyvine videos 195 from a rich storyboard 115, according to various embodiments. As discussed above, embodiments of the video production environment 500 include a storyvine storyboard subsystem 110, a storyvine audit subsystem 170, a storyvine render subsystem 190, an asset coach subsystem 130, and an asset audit subsystem 150. Concept designers 213 and production experts 215 and/or any other individuals or entities (e.g., agency personnel and marketing experts) collaborate to mature a storyvine concept 501 and various rules into a rich storyboard 115 via the storyvine storyboard subsystem 110. The various rules can include business rules 503, interactivity rules 505, production rules 507, and/or any other useful rules for guiding creation of the rich storyboard 115.

The rich storyboard 115 defines various types of specifications, for example, in computer-readable form. The specifications can effectively embody the high-level storyvine concept 501 and rules, while providing workflow direction at a very detailed level. Embodiments of the rich storyboard 115 define coaching specifications 521, asset gathering specifications 523, asset approval specifications 525, roles specifications 527, production specifications 529, and/or any other suitable specifications. For example, asset gathering specifications 523 can define what shared, individualized, and/or other storybeat asset data 543 is desired, including defining the assets and any useful attributes in support of acquiring, generating, and using the assets. Coaching specifications 521 can define, for each individualized storybeat asset, information to provide coaches 537 and/or the asset coach subsystem 130 for interactively guiding a storymaker 539 through providing desired storybeat asset data 543.

Embodiments of the asset coach subsystem 130 provides interactive coaching to storymakers 539 to provide individualized storybeat asset data according to the coaching specifications 521 and asset gathering specifications 523. In some implementations, the asset coach subsystem 130 is an application of a computational system that has a pool of coaching assets 535 (e.g., standard wizard layouts, standard virtual coaches, etc.) and coaching application programming specifications 533 (e.g., application programming interface (API) command sets). The coaching assets 535 and coaching application programming specifications 533 provide a framework within which to build an interactive coaching environment for acquiring any desired individualized storybeat asset data. Using this framework and the coaching specifications 521 and asset gathering specifications 523 from the rich storyboard 115, a full coaching environment can be built in the asset coach subsystem 130. In some implementations, the coaching specifications 521 and asset gathering specifications 523 are provided in a computer-readable format that conforms with the coaching assets 535 and coaching application programming specifications 533, so that the asset coach subsystem 130 can build the coaching interface automatically with little or no manual intervention. In other implementations, building of the coaching interface involves some human intervention, for example, including design and/or programming of coaching assets 535, interface elements, wizard layouts, etc.

Some implementations of the asset coach subsystem 130 use only virtual coaches (e.g., standard recordings of live coaches stored as part of the coaching assets 535, coaching assets generated as part of the storyboarding phase and communicated as part of the coaching specifications 521, computer-generated coaches, etc.). Other implementations additionally or alternatively use live, interactive coaching. For example, a live text and/or video chat interface is provided as part of the coaching interface that allows the storymaker 539 to interact live with an individual coach 537 (e.g., and the coach 537 is directed by human-readable coaching specifications 521 from the rich storyboard 115. Some embodiments of the asset coach subsystem 130 operate further according to roles specifications 527 of the rich storyboard 115. For example, the roles specifications 527 can govern (or guide) who can be a storymaker 539 or coach 537 for a particular storybeat asset.

Figure 6:
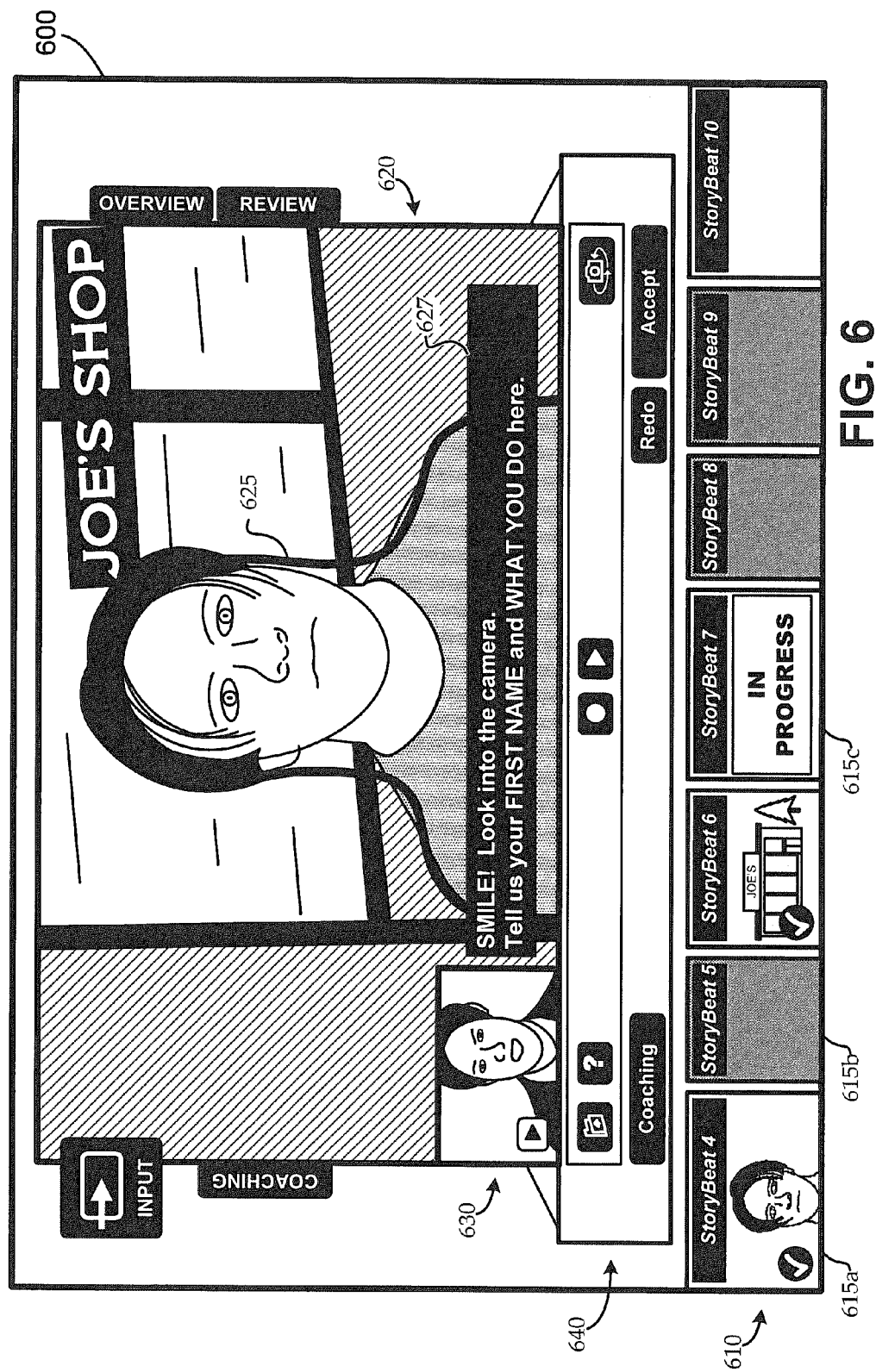
FIG. 6 shows a screenshot from a coaching interface of an illustrative asset coach subsystem, for use with various embodiments.

For the sake of illustration, FIG. 6 shows a screenshot from a coaching interface 600 of an illustrative asset coach subsystem 130, for use with various embodiments. The coaching interface 600 may be implemented on a tablet computer that includes or is coupled with a video camera. The coaching interface 600 includes a number of regions, each having various interactive elements. One illustrative region is a storybeat sequence and status region 610 that includes a number of storybeat icons 615. The storybeat icons 615 provide an overview of the sequence of storybeats in the rich storyboard 115 and the status of each storybeat in the sequence. For example, storybeat icon 615*a* indicates that "Storybeat 4" has been acquired (illustrated by a thumbnail image of a portion of the data) and approved (illustrated by a checkmark in the storybeat icon 615*a*); storybeat icon 615*b* indicates that "Storybeat 5" has no associated individualized storybeat asset data to acquire; and storybeat icon 615*c* indicates that "Storybeat 7" is the storybeat for which associated individualized storybeat asset data is presently being acquired.

Another illustrative region is an interactive asset acquisition region 620. The interactive asset acquisition region 620 can include any interactive elements for acquiring the desired asset data, according to the asset gathering specifications 525, coaching specifications 521, etc. In the illustrated scenario, the desired storybeat asset is a short video that features a frontal, close-up view of an employee storymaker standing in front of the Joe's Shop building, introducing himself. The interactive asset acquisition region 620 includes a number of illustrative interactive coaching elements to help guide the storymaker to provide the desired input. One such interactive coaching element is a camera positioning guide 625. The camera positioning guide 625 can be a thick outline of a hypothetical storymaker's head and shoulders that is sized and positioned so that, when the camera is positioned properly, the featured storymaker's head and shoulders will substantially match the outline of the hypothetical storymaker's head and shoulders (as illustrated). In this way, the storymaker (or whoever is acquiring the footage) can intuitively know that the camera is an appropriate distance, angle, etc. with respect to the featured storymaker. Another such interactive coaching element is a content guide 627. The content guide 627 can be text or some other prompt to help inform the storymaker of the type of content desired. The illustrative content guide 627 is a text box giving general guidance to the storymaker: "Smile! Look into the camera. Tell us your first name and what you do here."

As discussed above, any camera positioning guides 625, content guides 627, and/or other types of interactive coaching elements are generated according to specifications of the rich storyboard 115. For example, the specifications include instructions written in a format that can be interpreted according to coaching APIs of the asset coaching application to automatically generate the camera positioning guide 625 in the interactive asset acquisition region 620 when data for the respective storybeat is being acquired. It is worth noting that, as in the illustrated scenario, it can be desirable to generate storybeats as small, logical segments of desired information (e.g., rather than as long format videos, etc.). This can allow desired information to be acquired in fewer takes by inexperienced storymakers, facilitate re-use of the storybeat in other contexts, etc.

Another illustrative region is a coach region 630. As illustrated, the coach region 630 can include audio and/or video of a live or virtual coach talking the storymaker through providing appropriate information. The coach region 630 can display pre-recorded information (e.g., a pre-recorded video of a coach telling the storymaker what to provide, a pre-recorded example of appropriate content to provide for the asset, etc.), live information (e.g., a live audio and/or video chat interface), and/or any other suitable information. As discussed above, the coach region can be built automatically and/or manually using specifications from the rich storyboard 115, coaching assets, coaching APIs, etc.

Still other illustrative regions are navigation regions 640. The navigation regions 640 can include any useful buttons, controls, and/or other interactive elements for navigating the coaching interface, asset acquisition, etc. As illustrated, navigation controls are distributed around and within the various other regions. For example, below the interactive asset acquisition region 620 and the coach region 630 is a set of navigation buttons for accessing files, seeking help, recording data, playing back data, adjusting camera settings, and the like. In some implementations, some or all of the navigation regions 640 are common across all coaching interfaces for all storybeats, for example, according to coaching assets, coaching APIs, and/or other properties of the asset coaching application. In other implementations, some or all of the navigation regions 640 are configurable by the storymaker according, for example, to application preferences. According to still other implementations, some or all of the navigation regions 640 are generated automatically according to specifications of the rich storyboard 115.

Returning to FIG. 5, the output of the asset coach subsystem 130 is storybeat data 135. According to some embodiments, the storybeat data 135 includes storybeat assets 543 and associated asset metadata 545. In one example, a storybeat asset 543 is a video of a storymaker 539 introducing herself. Some asset metadata 545 can be acquired or derived from the rich storyboard 115, such as associated asset gathering specifications 523, asset approval specifications 525, production specifications 529, storymaker information (e.g., which storymaker 539 is associated with the acquired asset, demographics or affiliations of the storymaker 539, etc.), etc. Other asset metadata 545 can be acquired or derived from the asset gathering and/or approval phases, such as status (e.g., whether the asset has been acquired and approved), acquired attributes (e.g., actual duration, color information, resolution, size, format, etc.), tracking information (e.g., how many takes occurred prior to approval of the asset data, how much virtual and/or live coaching was used, etc.), etc.

The storybeat data 135 can be communicated to an asset audit subsystem 150. In some implementations, the asset audit subsystem 150 is an automated system that automatically audits the storybeat data 135 according to asset approval specifications 525 from the rich storyboard 115. For example, the asset audit subsystem 150 can check whether a video asset is of proper resolution, duration, brightness, format, composition, etc. Additional processing (e.g., image, voice, and/or other recognition techniques) can be used to determine whether the video asset includes desired content, includes impermissible content (e.g., copyrighted material, inappropriate language or other material, statements prohibited by law or business rules, etc.), etc. In other implementations, the asset audit subsystem 150 involves human auditors. Embodiments of the asset audit subsystem 150 can be implemented as part of the asset coach subsystem 130, on the same device as the asset coach subsystem 130, remotely from the asset coach subsystem 130 (e.g., as part of an agency system over a public or private network, as part of a cloud-based application over the Internet, etc.), or in any other suitable manner.

If the storybeat data 135 is not approved, the asset audit subsystem 150 can permit or instruct the storymaker 539 to provide the storybeat data 135 again. In some implementations, the asset audit subsystem 150 indicates to the asset coach subsystem 130 that the storybeat data 135 was not approved, and the coaching interface of the asset coach subsystem 130 is updated accordingly. For example, the asset coach subsystem 130 displays some or all of the individualized storybeat assets to be acquired through the asset coach subsystem 130, and indicates which ones have been acquires, which have been approved, etc. In another example, when a storymaker 539 finishes an attempt at inputting storybeat data 135 (e.g., shoots a take of a video segment), the data is automatically validated (or the storymaker 539 can select, via the coaching interface, to have the data validated) via the asset audit subsystem 150. If the data is not validated, the storymaker 539 is informed and prompted to try again.

If the storybeat data is approved, it can be communicated to the storyvine render subsystem 190. The storyvine render subsystem 190 is operable to render the storybeat data 135 according to production specifications 529 of the rich storyboard. In some embodiments, the storyvine render subsystem 190 includes render application programming specifications 593 (e.g., APIs), and the production specifications 529 are configured to direct rendering of storybeat data 135 via the render application programming specifications 593. In some embodiments, the storyvine render subsystem 190 can generate pre-rendered storybeats 583. For example, rather than rendering a complete storyvine video 195 at full quality, "proofs" can be generated of particular storybeats (e.g., those including individualized storybeat assets). The pre-rendered storybeats 583 can be communicated to the storyvine audit subsystem 170 for approval according to the asset approval specifications 525 of the rich storyboard 115. In some implementations, the pre-rendering functionality is collocated with the asset coach subsystem 130. For example, the asset coach subsystem 130 is an application of a storymaker device that includes pre-rendering functionality for use by the storymaker 539 for self-auditing, by the asset audit subsystem 150 for auditing the asset data in context, by the storyvine audit subsystem 170 for auditing as a completed storybeat, etc. In other implementations, the pre-rendering functionality is separate from the asset coach subsystem 130, for example, as part of an agency server, a cloud-based system, etc.

If the storybeat data is approved, other embodiments communicate the data to the storyvine render subsystem 190 for rendering of a complete storyvine video 195. In some such embodiments, the rendered video is first generated as a pre-approved storyvine video 585. The pre-approved storyvine video 585 is communicated to the storyvine audit subsystem 170 for approval according to the asset approval specifications 525, automatically and/or manually (by auditors 273). The pre-approved storyvine video 585 can be a rough version, full-quality version, or any other useful version. Once approved, the video production can be considered as (e.g., or re-rendered as) a final approved storyvine video 195.

If the pre-approved storyvine video 585 is not approved, various options can be taken. For example, the storyvine render subsystem 190 can re-render the data according to modified specifications (e.g., which may be manually adjusted or automatically adjusted according to specifications, rules, or parameters of the rich storyboard 115), new or replacement assets can be selected as storybeat data 135 (e.g., from a pool of assets, etc.), individualized storybeat data 135 can be reacquired via the asset coach subsystem 130, etc. Because assets are acquired, edited, generated, approved, rendered, and/or otherwise handled according to specifications of the rich storyboard 115, disapproval of pre-rendered storybeats 583 or pre-approved storyvine videos 585 can indicate a desired change in the rich storyboard itself. For example, specifications of the rich storyboard 115 can be adjusted to direct re-rendering, reacquisition, re-approval, and/or other re-handling of the storybeat data 135. In this way, all subsequent storyvine videos 195 generated from the adjusted rich storyboard 115 will satisfy the updated specifications.

In some implementations, the final storyvine videos 195 are effectively static (e.g., non-interactive) outputs, like standard video files for display through a video player or the like. In other implementations, the final storyvine videos 195 are rendered with embedded dynamic and/or interactive functionality. Dynamic functionality can permit the storyvine videos 195 to dynamically adapt to implicit and/or explicit inputs from an end-viewer, player application, end-viewer system, etc. For example, portions of the storyvine videos 195 can dynamically change based on the geographical location of the end-viewer, time of day, player attributes (e.g., browser type, display type, display size, connection speed, etc.), related contextual information (e.g., current stock market conditions, etc.), or any other suitable information. In one illustrative example, a real estate brokerage outputs storyvine videos 195 built from asset data that includes introduction videos from hundreds of agents, but dynamically selects 3 of those agent introduction videos depending on demographic information of the end-viewer. In certain embodiments, the dynamic functionality is realized by adjusting rendering parameters (e.g., production specifications 529 of the rich storyboard 115), so that the storyvine render subsystem 190 can dynamically render the storyvine videos 195 according to the dynamically changing parameters. In other embodiments, the dynamic functionality is embedded in the rendered output (e.g., as embedded code). For example, a storyvine video 195 is rendered for playback through a web browser interface and has browser-readable code embedded therein for dynamically affecting the displayed video according to dynamically received implicit and/or explicit input data.

Some implementations support interactive functionality in the rendered storyvine videos 195. The storyvine videos 195 can include embedded prompts and/or the like, and can be operable to respond to those prompts. In one illustrative implementation, a storyvine videos 195 includes a branching storyline that responds to selections by an end-viewer. In another illustrative implementation, a storyvine video 195 includes link, portal, or other functionality through which end-viewers can provide their own video information (e.g., their own individualized storybeat asset data). For example, a professor creates a storyvine video 195 that includes video footage of him performing a demonstration of a technique, asking the students a series of questions, and soliciting a video response from the students. The video can then provide a link or other mechanism through which the students can provide their video responses. The video responses can be handled by embodiments as new storyvine videos 195, as new individualized storybeat asset data for the present storyvine video 195, or in any useful way. The video responses can also be tagged with an association to the professor's video, with the student names, with timestamp information, etc. The dynamic and/or interactive functionality of various embodiments can further be fed back to one or more systems or subsystems to affect any of their respective input or output information (e.g., business rules 503, coaching specifications 521, asset gathering specifications 523, etc.).

Figure 7:
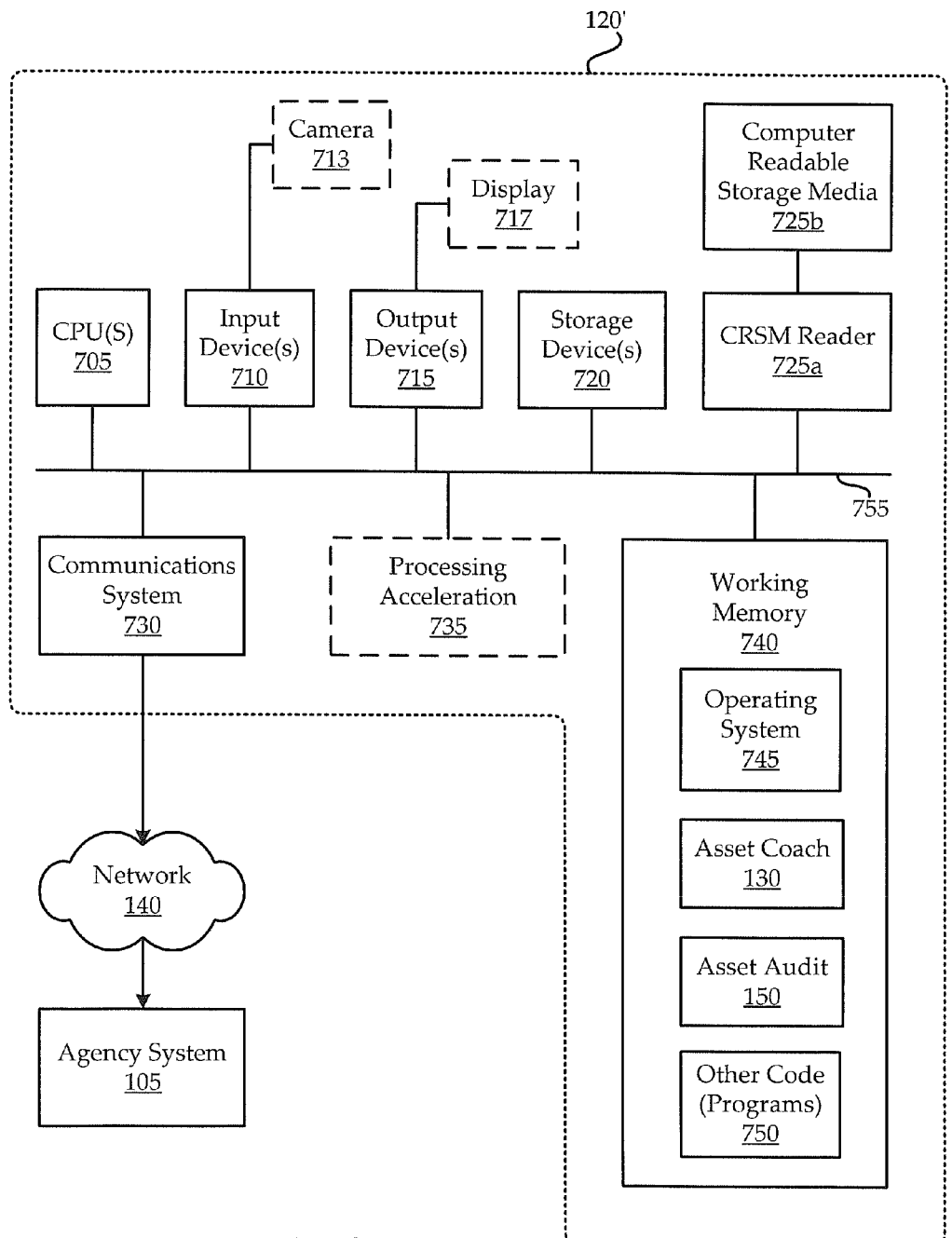
FIG. 7 shows an illustrative computational system for implementing one or more systems or components of systems, according to various embodiments.

FIG. 7 shows an illustrative computational system 700 for implementing one or more systems or components of systems, according to various embodiments. The computational system 700 is described as implementing functionality of an illustrative storymaker system 120', like the storymaker system 120' described with reference to FIG. 1. Similar computational systems can be used to implement functionality of other systems, subsystems, or components of the agency system 105 described with reference to FIG. 1, such as a storyvine storyboard subsystem 110, a storyvine audit subsystem 170, and/or a storyvine render subsystem 190. Embodiments of the computational system 700 can be implemented as or embodied in single or distributed computer systems, or in any other useful way. For example, the storymaker system 120' can be implemented on a desktop, laptop, or tablet computer; a smartphone or other portable interactive media device (e.g., a smart video camera); a dedicated device, etc.

The computational system 700 is shown including hardware elements that can be electrically coupled via a bus 755. The hardware elements can include one or more central processing units (CPUs) 705, one or more input devices 710 (e.g., a video or still camera 713, a mouse, a keyboard, etc.), and one or more output devices 715 (e.g., a display device 717, a printer, etc.). The computational system 700 can also include one or more storage devices 720. By way of example, storage device(s) 720 can be disk drives, optical storage devices, solid-state storage device such as a random access memory (RAM) and/or a read-only memory (ROM), which can be programmable, flash-updateable and/or the like. In some embodiments, the storage devices 720 are configured to store specifications received from the rich storyboard 115 (not shown), generated storybeat data, and the like, as described above.

The computational system 700 can additionally include a computer-readable storage media reader 725a, a communications system 730 (e.g., a modem, a network card (wireless or wired) or chipset, an infra-red communication device, etc.), and working memory 740, which can include RAM and ROM devices as described above. In some embodiments, the computational system 700 can also include a processing acceleration unit 735, which can include a DSP, a special-purpose processor and/or the like.

The computer-readable storage media reader 725a can further be connected to a computer-readable storage medium 725b, together (and, optionally, in combination with storage device(s) 720) comprehensively representing remote, local, fixed, and/or removable storage devices plus storage media for temporarily and/or more permanently containing computer-readable information. The communications system 730 can permit data to be exchanged with a public or private network (e.g., network 140) and/or any other system. For example, as described above, rich storyboard 115 specifications can be communicated between components or subsystems of the storymaker system 120' and components or subsystems of the agency system 105 via the communications system 730 (e.g., and via the network 140).

The computational system 700 can also include software elements, shown as being currently located within a working memory 740, including an operating system 745 and/or other code 750, such as an application program (which can be a client application, web browser, mid-tier application, relational database management system (RDBMS), etc.). In some embodiments, one or more functions of the storymaker system 120' are implemented as application code 750 in working memory 740. As illustrated, the asset coach subsystem 130 and/or the asset audit subsystem 150 can be implemented as applications in working memory of the storymaker system 120'. Each of these applications can also include various stored information, such as APIs and the like.

It should be appreciated that alternate embodiments of a computational system 700 can have numerous variations from that described above. For example, customized hardware might also be used and/or particular elements might be implemented in hardware, software (including portable software, such as applets), or both. Further, connection to other computing devices such as network input/output devices can be employed. In various embodiments a computational system like the one illustrated in FIG. 7 is used to implement one or more functions of the storymaker system 120', and the computational system 700 is in communication with other functional components as needed or desired. In other embodiments, computational systems 700 like the one illustrated in FIG. 7 are used to implement one or more methods of the system, such as those described below.

Figure 8:
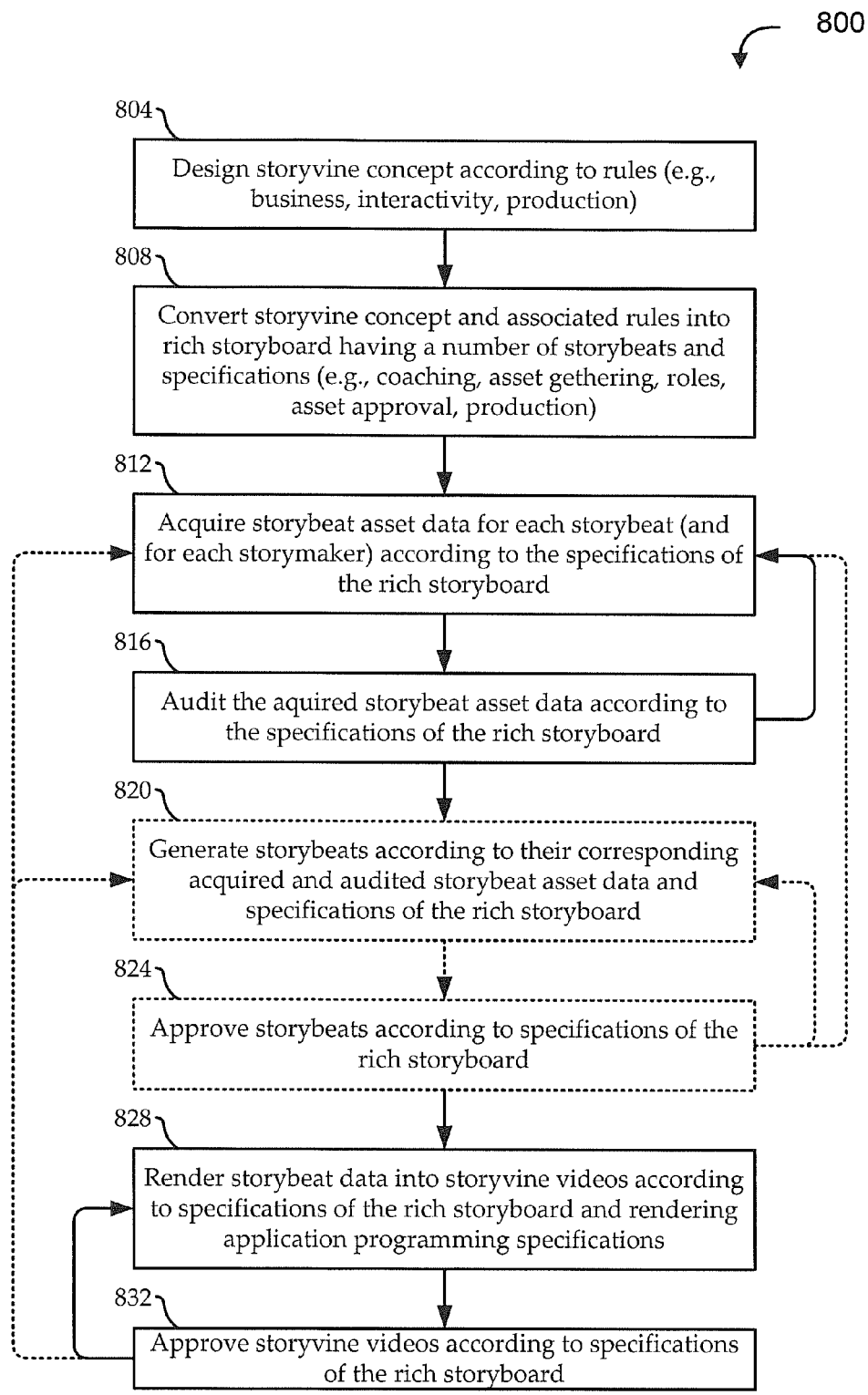
FIG. 8 shows a flow diagram of an illustrative method for directing video production using specifications defined by a rich storyboard, according to various embodiments.

FIG. 8 shows a flow diagram of an illustrative method 800 for directing video production using specifications defined by a rich storyboard, according to various embodiments. Embodiments of the method 800 begin at stage 804 by designing a storyvine concept with rules (e.g., business, interactivity, production, and/or other rules). For example, an agency and its marketing department decide on a concept for a set of videos and identify any relevant rules that should govern production of those videos. At stage 808, the storyvine concept and associated rules are converted into a rich storyboard having a number (e.g., sequence) of storybeats and specifications. The specifications can effectively embody the concept and rules into discrete coaching specifications, asset gethering specifications, roles specifications, asset approval specifications, production specifications, and/or any other useful specifications (e.g., in a computer-readable format).

At stage 812, storybeat asset data is acquired for each storybeat according to the specifications of the rich storyboard. For example, and asset coaching subsystem and an asset audit subsystem can be generated (e.g., built automatically) according to the rich storyboard specifications and associated APIs and/or pre-generated assets. The asset coaching subsystem and an asset audit subsystem can be used to acquire and approve any individualized storybeat asset data from storymakers according to the specifications of the rich storyboard (e.g., via a coaching interface through which individualized storybeat asset data is acquired in an interactively coached manner). In some instances, the rich storyboard is used to generate multiple storyvine video productions according to common specifications, but having individualized data from multiple storymakers. For example, each of a number of storymakers can provide individualized storybeat asset data for each of a number of storybeats serially, in parallel, or in any other suitable manner. Accordingly, embodiments of stage 812, acquire storybeat asset data for each storybeat for each of a number of storymakers (e.g., through one or more versions of the coaching interface).

At stage 816, the acquired storybeat asset data can be audited (e.g., approved, checked, validated, etc.) according to the specifications of the rich storyboard. The auditing can be performed as storybeat asset data is being acquired, after each storybeat asset is "finalized" by the storymaker (e.g., on request from a storymaker after the storymaker is satisfied by the provided asset data), after all individualized asset data for a storybeat or an entire storyvine is collected, or at any other useful time. Further, in some implementations, the auditing is performed in a completely automated manner according to asset approval specifications of the rich storyboard. In other implementations, some or all of the auditing is performed manually (e.g., by an approved auditor according to roles specifications). For example, individualized storybeat asset data for certain storybeats can be automatically audited first, and then verified by a human auditor.

Some embodiments handle acquisition and auditing at the asset level (e.g., according to stages 812 and 816), and rendering and final approval at the storyvine level (e.g., according to stages 828 and 832, as described below). Other embodiments of the method 800 perform certain functions at the storybeat level (e.g., according to stages 820 and 824). According to such embodiments, at stage 820, storybeats are generated (e.g., partially or fully rendered, at full or partial quality) according to their corresponding acquired and audited storybeat asset data and specifications of the rich storyboard. For example, all the assets of a particular storybeat are acquired and pre-rendered (as a rough cut, or the like). At stage 824, each storybeat can be audited according to specifications of the rich storyboard. For example, manual and/or automatic auditing can be performed to make sure the storybeat conforms to the rich storyboard specifications and/or its formative concept and rules. If not, this stage can permit earlier detection of undesirable results in time to more easily reacquire individualized asset data, re-generate or reacquire shared or other assets, adjust storyboard specifications, etc.

Regardless of whether the method 800 includes storybeat-level functionality, storybeat data can be rendered into storyvine videos at stage 828, according to specifications of the rich storyboard and rendering application programming specifications. For example, production specifications, render APIs, and/or other information is used to automatically render the storyvine video. As described above, the specifications can drive storybeat sequences, asset placements, scene transitions, audio synchronization, dynamic asset generation (e.g., where shared assets automatically adjust according to acquired individualized asset data), and/or any other useful aspects of rendering (e.g., including post-production, editing, re-colorizing, formatting, up- or down-converting, etc.). In some embodiments, at stage 832, the storyvine videos (e.g., each storyvine video) is audited according to specifications of the rich storyboard. If a video is not approved, embodiments may return to a suitable stage, such as to regenerate or reacquire particular assets at stage 812, to regenerate a particular one or more individual storybeats at stage 820, etc.

Figure 9:
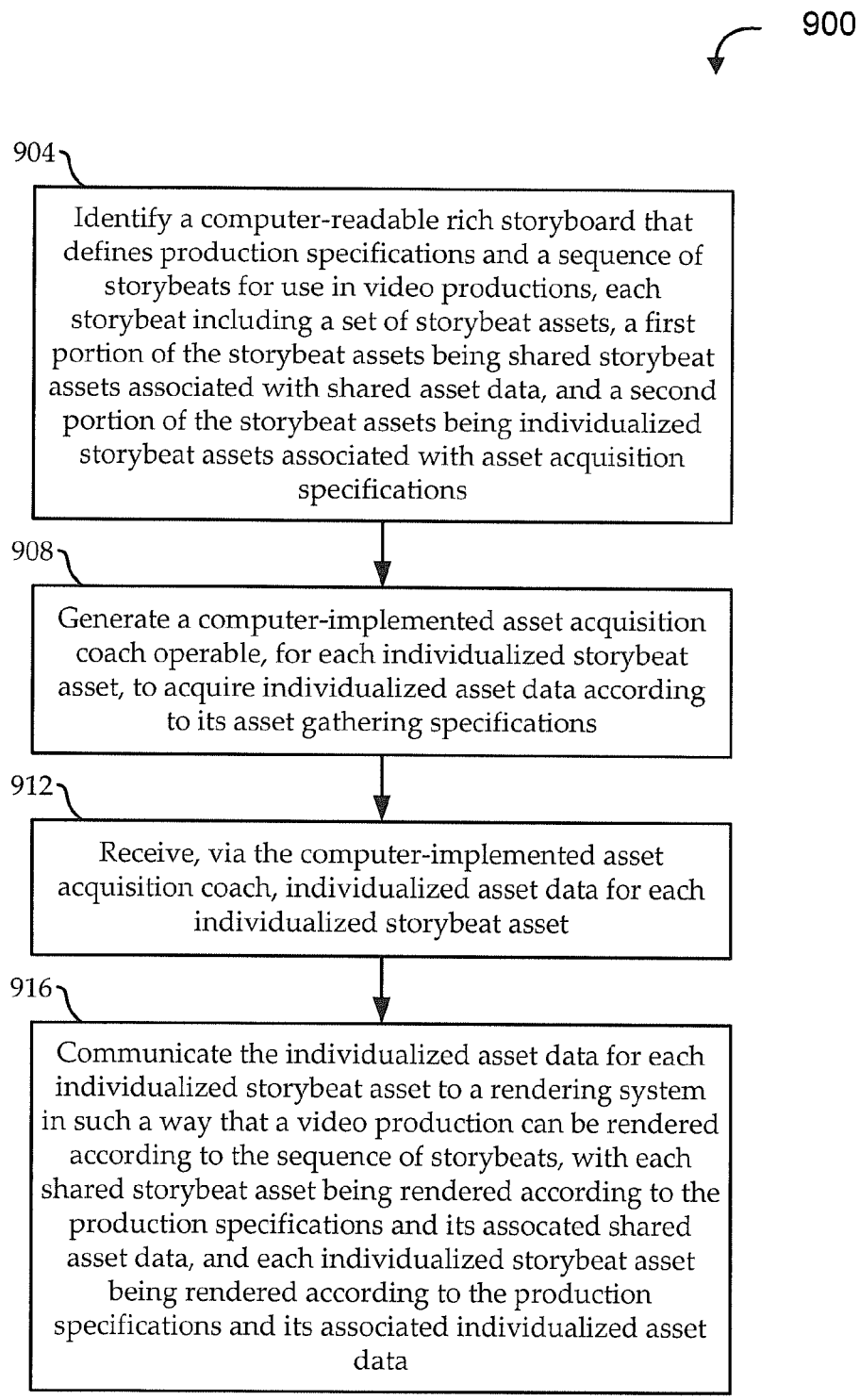
FIG. 9 shows a flow diagram of an illustrative method for acquisition of individualized storybeat asset data, according to various embodiments.

Some embodiments focus on acquisition of individualized storybeat asset data, for example, according to stage 812. FIG. 9 shows a flow diagram of such a method 900, according to various embodiments. Embodiments of the method 900 can be implemented on any suitable system, for example, on a storymaker system like the ones described above with reference to FIGS. 1, 5, and 7. Embodiments begin at stage 904 by identifying a computer-readable rich storyboard that defines production specifications and a sequence of storybeats for use in a number of video productions. Each storybeat has a set of storybeat assets, a first portion of the storybeat assets being shared storybeat assets associated with shared asset data, and a second portion of the storybeat assets being individualized storybeat assets associated with asset acquisition specifications. For example, a particular storybeat includes a video of a storymaker introducing himself. The video segment is an individualized storybeat asset, while surrounding graphics (e.g., logos, frames, etc.), background audio, and/or other elements of the scene are shared storybeat assets. If many videos are taken of many storymakers, they will all have unique video segment content, but the same (or substantially the same) surrounding elements.

At stage 908, a computer-implemented asset acquisition coach is generated to be operable, for each individualized storybeat asset, to acquire individualized asset data according to its asset gathering specifications. For example, the computer-implemented asset acquisition coach can be an application that provides an interactive coaching interface (e.g., like the one described in FIG. 6). At stage 912, individualized asset data is received for each individualized storybeat asset via the computer-implemented asset acquisition coach. In some implementations, the individualized asset data is received for each individualized storybeat asset via a graphical user interface (GUI) designed to coach a storymaker to provide the individualized asset data associated with the individualized storybeat asset according to its asset gathering specifications (e.g., an interactive coaching interface). The individualized asset data associated with the individualized storybeat asset can be received from the storymaker via the GUI. In some embodiments, the GUI is built (e.g., automatically) from asset gathering specifications, predefined coaching assets, coaching APIs, and/or any other useful information.

In some implementations, as described above, receiving the individualized asset data includes auditing the individualized asset data to determine whether the asset data conforms with the asset gathering specifications. For example, the rich storyboard further defines acceptance specifications associated with each individualized storybeat asset. The acceptance specifications can be derived from or separate from the asset gathering specifications. When the asset data conforms with the asset gathering specifications, the asset data can be stored (or tagged, etc.) in association with the individualized asset, the storymaker, the agency, or any other useful information. When the asset data does not conform with the asset gathering specifications, the asset data can be discarded, stored for tracking purposes, or handled in any suitable manner. In some embodiments, when the asset data does not conform, the method 900 can attempt to re-acquire the asset data until conforming data is received.

In some implementations, a separate set of individualized asset data for the individualized storybeat assets is received from and in association with each of a plurality of storymakers via the computer-implemented asset acquisition coach. For example, each storymaker's assets are acquired and tagged (e.g., stored in associated with) an identifier of the storymaker (e.g., received through the interface as part of asset acquisition, as part of a login process, etc.). Some embodiments include a corresponding version of the computer-implemented asset acquisition coach for each storymaker. For example, each storymaker sees a customized version of the coaching interface (e.g., according to the storymaker's preferences, etc.). Alternatively, each version of the asset acquisition coach is substantially the same, though implemented on the each storymaker's device. The set of individualized asset data for the individualized storybeat assets can be received from and in association with each of the plurality of storymakers via the corresponding version of the computer-implemented asset acquisition coach.

At stage 916, the individualized asset data for each individualized storybeat asset is communicated to a rendering system in such a way that a video production can be rendered according to the sequence of storybeats, with each shared storybeat asset being rendered according to the production specifications and its associated shared asset data, and each individualized storybeat asset being rendered according to the production specifications and its associated individualized asset data.

As described above (e.g., with reference to the method 800 of FIG. 8), some embodiments render the video production according to the sequence of storybeats for each storymaker. The rendering can be performed so that each video production is common according to the sequence of storybeats and the production specifications of the rich storyboard, and each video production is individualized according to the set of individualized asset data received in association with the respective storymaker. In certain implementations, the rendered video productions can be audited according to storyvine approval specifications defined by the rich storyboard.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The various operations of methods and functions of certain system components described above can be performed by any suitable means capable of performing the corresponding functions, including, for example, hardware and/or software. The steps of a method or algorithm or other functionality described in connection with the present disclosure, can be embodied directly in hardware, in a software module executed by a processor, or in a combination of the two. A software module can reside in any form of tangible storage medium. Some examples of storage media that can be used include random access memory (RAM), read only memory (ROM), flash memory, EPROM memory, EEPROM memory, registers, a hard disk, a removable disk, a CD-ROM and so forth. A storage medium can be coupled to a processor such that the processor can read information from, and write information to, the storage medium. In the alternative, the storage medium can be integral to the processor.

A software module can be a single instruction, or many instructions, and can be distributed over several different code segments, among different programs, and across multiple storage media. Thus, a computer program product can perform operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for generating a video production from a rich storyboard, the method comprising:
    identifying a computer-readable rich storyboard that defines production specifications and a sequence of storybeats for use in a plurality of video productions, each storybeat comprising a set of storybeat assets, a first portion of the storybeat assets being shared storybeat assets associated with shared asset data, and a second portion of the storybeat assets being individualized storybeat assets associated with asset acquisition specifications;
    generating a computer-implemented asset acquisition coach operable, for each individualized storybeat asset, to acquire individualized asset data according to its asset gathering specifications;
    receiving, via the computer-implemented asset acquisition coach, individualized asset data for each individualized storybeat asset, the receiving comprising auditing the individualized asset data by the computer-implemented asset acquisition coach to determine whether the asset data conforms with acceptance specifications defined by the rich storyboard in association with each individualized storybeat asset; and
    communicating the individualized asset data for each individualized storybeat asset to a rendering system in such a way that a video production can be rendered according to the sequence of storybeats, with each shared storybeat asset being rendered according to the production specifications and its associated shared asset data, and each individualized storybeat asset being rendered according to the production specifications and its associated individualized asset data.

2. The method of claim 1, wherein:
    receiving the individualized asset data for each individualized storybeat asset comprises receiving a separate set of individualized asset data for the individualized storybeat assets from and in association with each of a plurality of storymakers via the computer-implemented asset acquisition coach.

3. The method of claim 2, further comprising:
    rendering the video production according to the sequence of storybeats for each storymaker, such that each video production is common according to the sequence of storybeats and the production specifications of the rich storyboard, and each video production is individualized according to the set of individualized asset data received in association with the respective storymaker.

4. The method of claim 2, wherein:
    a corresponding version of the computer-implemented asset acquisition coach is available to each of the plurality of storymakers via a corresponding storymaker device; and
    the set of individualized asset data for the individualized storybeat assets is received from and in association with each of the plurality of storymakers via the corresponding version of the computer-implemented asset acquisition coach available to the storymakers via the corresponding storymaker device.

5. The method of claim 1, wherein:
    receiving the individualized asset data for each individualized storybeat asset comprises:
        displaying a graphical user interface designed to coach a storymaker to provide the individualized asset data associated with the individualized storybeat asset according to its asset gathering specifications;
        receiving the individualized asset data associated with the individualized storybeat asset from the storymaker via the graphical user interface;
        auditing the individualized asset data to determine whether the asset data conforms with the asset gathering specifications; and
        storing the asset data in association with the individualized asset only when the asset data conforms with the asset gathering specifications.

6. The method of claim 5, wherein:
the computer-implemented asset acquisition coach comprises a set of predefined coaching assets separate from the rich storyboard and a set of application programming specifications; and
displaying the graphical user interface comprises building the graphical user interface according to the predefined coaching assets, the set of application programming specifications, and the asset gathering specifications.

7. The method of claim 1, further comprising:
rendering the video production according to the sequence of storybeats comprising rendering each shared storybeat asset according to the production specifications and its associated shared asset data, and rendering each individualized storybeat asset according to the production specifications and its associated individualized asset data.

8. The method of claim 7, further comprising:
auditing the rendered video production according to storyvine approval specifications defined by the rich storyboard.

9. A computer program product residing on a non-transitory, processor-readable medium and having processor-readable instructions, which, when executed, cause a processor to perform the method of claim 1.

10. A storymaker system for acquiring individualized assets for use in video productions generated according to a rich storyboard, the system comprising:
a computer-implemented asset coaching subsystem operable to:
receive asset acquisition specifications generated according to a rich storyboard that defines production specifications and a sequence of storybeats for use in a plurality of video productions, each storybeat comprising a set of storybeat assets, a first portion of the storybeat assets being shared storybeat assets associated with shared asset data, and a second portion of the storybeat assets being individualized storybeat assets associated with the asset acquisition specifications and asset acceptance specifications; and
acquire, via a computer-implemented graphical asset acquisition interface, individualized asset data for each individualized storybeat asset according to its respective asset gathering specifications; and
a computer-implemented asset auditing subsystem, in communication with the asset coaching subsystem, and operable to audit the individualized asset data to determine whether the individualized asset data conforms with the asset acceptance specifications,
the computer-implemented asset coaching subsystem further operable, when the individualized asset data conforms with the asset acceptance specifications, to communicate the individualized asset data of each individualized storybeat asset in such a way that a video production can be rendered according to the sequence of storybeats with each individualized storybeat asset being rendered according to the production specifications and its associated individualized asset data.

11. The system of claim 10, wherein:
the asset coaching subsystem and the asset auditing subsystem are implemented on a computer-implemented storymaker system in communication with a remote agency system over a communications network; and
the asset acquisition specifications and the asset acceptance specifications are received from a storyboard subsystem if the agency system over the communications network.

12. The system of claim 10, wherein:
the asset coaching subsystem is implemented on a computational device of one of a plurality of storymaker users;
the asset coaching subsystem is operable to receive acquire the individualized asset data for each individualized storybeat asset from the storymaker user via the computer-implemented graphical asset acquisition interface; and
the asset coaching subsystem is further operable to associate the individualized asset data of each individualized storybeat asset with the storymaker user.

13. The system of claim 10, further comprising:
a computer-implemented storyvine rendering subsystem operable to:
receive the individualized asset data of each individualized storybeat asset from the asset coaching subsystem; and
render a video production according to the sequence of storybeats comprising rendering each shared storybeat asset according to the production specifications and its associated shared asset data, and rendering each individualized storybeat asset according to the production specifications and its associated individualized asset data.

14. The system of claim 13, wherein the computer-implemented asset auditing subsystem is in communication with the storyvine rendering subsystem and is further operable to:
receive storyvine approval specifications defined by the rich storyboard; and
audit the rendered video production according to the storyvine approval specifications.

15. The system of claim 10, wherein:
the computer-implemented asset coaching subsystem comprises a set of predefined coaching assets separate from the rich storyboard and a set of application programming specifications; and
the computer-implemented asset coaching subsystem is further operable to generate and display the graphical asset acquisition interface according to the predefined coaching assets, the set of application programming specifications, and the asset gathering specifications of the individualized storybeat assets.

16. The system of claim 10, wherein:
the computer-implemented graphical asset acquisition interface comprises a video acquisition window and at least one graphical coaching element operable to interactively coach a storymaker user to provide individualized video information via the video acquisition window according to the asset gathering specifications of at least one individualized storybeat asset.

17. An agency system for acquiring individualized assets for use in video productions generated according to a rich storyboard, the system comprising:
a storyvine storyboard subsystem operable to:
generate a computer-readable rich storyboard that defines production specifications and a sequence of storybeats for use in a plurality of video productions, each storybeat comprising a set of storybeat assets, a first portion of the storybeat assets being shared storybeat assets associated with shared asset data, and a second portion of the storybeat assets being individualized storybeat assets associated with asset acquisition specifications; and
communicate the asset acquisition specifications to a computer-implemented asset coaching subsystem operable to acquire, via a graphical asset acquisition interface, individualized asset data for each individualized storybeat asset according to its respective asset gathering specifications; and a storyvine rendering subsystem operable to:
receive the individualized asset data for the individualized storybeat assets from the computer-implemented asset coaching subsystem, the receiving comprising auditing the individualized asset data by the computer-implemented asset acquisition coach to determine whether the asset data conforms with acceptance specifications defined by the rich storyboard in association with each individualized storybeat asset; and
render a video production according to the sequence of storybeats by rendering each shared storybeat asset according to the production specifications and its associated shared asset data, and by rendering each individualized storybeat asset according to the production specifications and its associated individualized asset data.

18. The system of claim 17, wherein:
the storyvine storyboard subsystem is implemented on a computational system in communication with a plurality of remote storymaker devices over a communications network, the computer-implemented asset coaching subsystem implemented on at least one of the storymaker devices.

19. The system of claim 18, wherein:
the storyvine rendering subsystem is remote from and in communication with the storyvine storyboard subsystem and the plurality of remote storymaker devices over the communications network.

20. The system of claim 18, wherein:
each storymaker device is associated with a storymaker user; and
a storyvine rendering subsystem is operable to:
receive the individualized asset data for the individualized storybeat assets from each storymaker device in association with its associated storymaker user; and
render a plurality of video productions, such that each video production is common according to the sequence of storybeats and the production specifications of the rich storyboard, and each video production is individualized according to the set of individualized asset data received in association with the respective storymaker user.

21. The system of claim 17, wherein:
the storyvine rendering subsystem comprises a set of application programming specifications;
the production specifications are defined by the rich storyboard according to the set of application programming specifications; and
the storyvine rendering subsystem is operable to render the video production according to the sequence of storybeats, the production specifications, and the set of application programming specifications.

22. The system of claim 17, further comprising:
a storyvine approval subsystem configured to audit the rendered video production according to storyvine approval specifications defined by the rich storyboard.

* * * * *